(12) United States Patent
Matsushima

(10) Patent No.: US 10,440,235 B2
(45) Date of Patent: Oct. 8, 2019

(54) INFORMATION PROCESSING APPARATUS, COLOR PROFILE GENERATION SYSTEM, INFORMATION PROCESSING METHOD, AND RECORDING MEDIUM

(71) Applicant: Yuki Matsushima, Kanagawa (JP)

(72) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/281,493

(22) Filed: Feb. 21, 2019

(65) Prior Publication Data

US 2019/0260912 A1 Aug. 22, 2019

(30) Foreign Application Priority Data

Feb. 21, 2018 (JP) .................................. 2018-029133
Feb. 18, 2019 (JP) .................................. 2019-026736

(51) Int. Cl.
*H04N 1/60* (2006.01)

(52) U.S. Cl.
CPC ........... *H04N 1/6058* (2013.01); *H04N 1/603* (2013.01)

(58) Field of Classification Search
CPC .......................... H04N 1/6058; H04N 1/603
See application file for complete search history.

(56) References Cited

U.S. PATENT DOCUMENTS

| 7,453,602 | B2 | 11/2008 | Shimada | |
|---|---|---|---|---|
| 2009/0284774 | A1* | 11/2009 | Kishimoto | H04N 1/6027 358/1.9 |
| 2013/0215440 | A1* | 8/2013 | Chandermohan | B41J 2/2117 358/1.9 |
| 2014/0240340 | A1 | 8/2014 | Shirasawa | |

FOREIGN PATENT DOCUMENTS

| JP | 4541772 | 9/2010 |
|---|---|---|
| JP | 2014-165656 | 9/2014 |

\* cited by examiner

*Primary Examiner* — Quang N Vo
(74) *Attorney, Agent, or Firm* — IPUSA, PLLC

(57) ABSTRACT

An information processing apparatus generates a second profile for reproducing, on a recording medium having a fluorescent characteristic, a color defined in a first profile. The information processing apparatus includes a processor configured to acquire, as a white color value of the recording medium, a colorimetric value obtained by colorimetric measurement of the recording medium under a colorimetric condition using a light source including ultraviolet rays; set a white reference value different from the white color value, based on the white color value; acquire, as a first target value, a color value in a Lab uniform color space defined by the first profile; acquire, as a second target value, a color value obtained by converting the acquired color value, based on the white reference value; and set the second target value with respect to a gamut having a chroma that is less than a first chroma.

13 Claims, 19 Drawing Sheets

INFORMATION PROCESSING APPARATUS, COLOR PROFILE GENERATION SYSTEM, INFORMATION PROCESSING METHOD, AND RECORDING MEDIUM

CROSS-REFERENCE TO RELATED APPLICATION

The present application is based on and claims priority under 35 U.S.C. § 119 to Japanese Patent Application No. 2018-029133, filed on Feb. 21, 2018, and Japanese Patent Application No. 2019-026736, filed on Feb. 18, 2019, the contents of which are incorporated herein by reference in their entirety.

BACKGROUND OF THE INVENTION

1. Field of the Invention

The present invention relates to an information processing apparatus, a color profile generation system, an information processing method, and a recording medium.

2. Description of the Related Art

For a printing machine used for commercial printing, etc., for example, it is required to acquire authentication of industrial standards such as Japan Color, Fogra, and GRACoL, etc. For this reason, in order to satisfy these standards, it is necessary to design and generate a profile used in a color management system (CMS). The profile is designed, for example, by setting a target value for a target defined by a predetermined standard, and performing colorimetric measurement and evaluation with respect to a result obtained by outputting the target value on a predetermined paper sheet.

On the other hand, in color matching between devices with different color characteristics, there is known a technique in which color conversion is performed with reference to paper white specific to the output apparatus in the low chroma color gamut, and a color reproduction gamut of an input apparatus is adopted in color gamuts other than the low chroma color gamut (see, for example, Patent Document 1).

Patent Document 1: Japanese Patent No. 4541772

SUMMARY OF THE INVENTION

An aspect of the present invention provides an information processing apparatus, a color profile generation system, an information processing method, and a recording medium in which one or more of the disadvantages of the related art are reduced.

According to one aspect of the present invention, there is provided an information processing apparatus for generating a second profile for reproducing, on a predetermined recording medium having a fluorescent characteristic, a color defined in a predetermined first profile, the information processing apparatus including a processor configured to acquire, as a white color value of the predetermined recording medium, a colorimetric value obtained by performing colorimetric measurement on the predetermined recording medium under a colorimetric condition of using a light source including ultraviolet rays; set a white reference value that is different from the white color value, based on the acquired white color value; acquire, as a first target value, a color value in a Lab uniform color space defined by the predetermined first profile; acquire, as a second target value, a color value obtained by converting the acquired color value in the Lab uniform color space, based on the white reference value; and set the second target value as a target value with respect to a gamut having a chroma that is less than a predetermined first chroma in the Lab uniform color space.

DETAILED DESCRIPTION OF THE PREFERRED EMBODIMENTS

Figure 1:
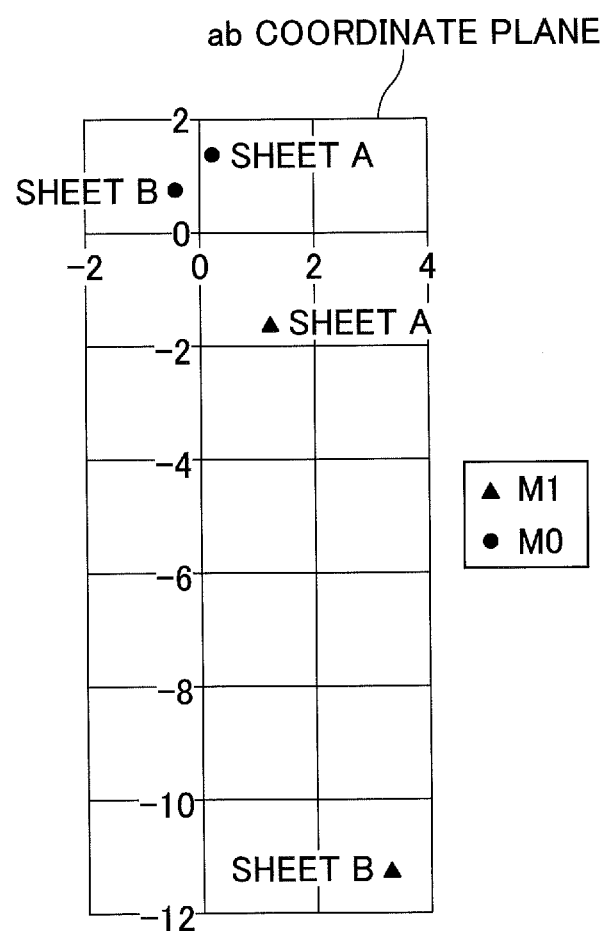
FIG. 1 is a diagram for describing an example of colorimetric results of paper sheets including different contents of optical brightening agent according to the related art.

In new standards of recent years, it is defined that M1 including ultraviolet rays is used as the colorimetric light source.

However, the colorimetric light source is M1, and, therefore, when colorimetric measurement is performed on a paper sheet containing a large amount of an Optical Brightening Agent (OBA) (OBA paper), there are cases where the color is measured to be bluer than the color that is subjectively perceived. For this reason, there have been cases where color fogging into yellow occurs near the achromatic color gamut (in the achromatic color vicinity gamut).

A problem to be solved by an embodiment of the present invention is to set a target value that suppresses color fogging in the achromatic color vicinity gamut, even for a recording medium having a strong fluorescent characteristic.

In the following, first and second embodiments of the present invention will be described. Before describing the first and second embodiments, various prerequisite terms and techniques will be described first.

<Premise>

When performing color matching between different image output apparatuses, matching is usually performed with color values such as XYZ tristimulus values. In general, the color value obtained by using a colorimeter is obtained by setting a color value (X, Y, Z)=(96.42, 100.0, 82.49) as white when measuring a perfectly diffusing plate under standard illumination of D50, and calculating a value relative to this white color. In the format of the International Color Consortium (ICC) profile that is the de facto standard in today's color management system, the color value relative to white of the perfectly diffusing plate is defined as "absolute", and the color value relative to white of the image output apparatus is defined as "relative". In each of the following embodiments, according to ICC, a color value relative to white of the perfectly diffusing plate obtained by using a colorimeter is referred to as an "absolute color value", and a color value relative to white of the image output apparatus is referred to as a "relative color value".

Furthermore, when color matching is performed to convert a color of a certain image output apparatus to a color of another image output apparatus by using an absolute color value, the color of the white of the certain image output apparatus (the image output apparatus that is the reproduction source) is reproduced by the other image output apparatus (the image output apparatus that is the reproduction destination). That is, when the absolute color value of white of the image output apparatus that is the reproduction source exists within the color gamut of the image output apparatus that is the reproduction destination, some kind of color is added to the white of the reproduction destination image output apparatus, to reproduce the white of the reproduction source image output apparatus. In each of the following embodiments, color conversion using an absolute color value is referred to as "absolute color conversion".

In the ICC profile, the absolute color value is converted into a relative color value, and this relative color value is used. By using this relative color value, the white colors of the different image output apparatuses will have the same color value. When color matching is performed to convert the color of the image output apparatus that is the reproduction source to a color of the image output apparatus that is the reproduction destination by using a relative color value, the white of the image output apparatus that is the reproduction source is reproduced as white of the image output apparatus that is the reproduction destination. In each of the following embodiments, color conversion using a relative color value is referred to as "relative color conversion".

Here, as described above, in order to acquire authentication of industrial standards such as Japan Color, Fogra, and GRACoL, etc., a target value is set for a target defined by these standards, and colorimetric measurement and evaluation are performed with respect to a result obtained by outputting the target value on a predetermined recording medium (paper sheet). That is, the target defined by these standards is set as the reproduction source, and a profile is designed such that the color of the reproduction source is reproduced at the image output apparatus that is the reproduction destination. This profile is also referred to as a printer profile. Note that targets are set in profiles distributed by organizations that established these standards.

Therefore, in each of the following embodiments, as an example, a profile in which the standard of Fogra 51 is set is referred to as the source profile, and a profile to be designed is referred to as an output profile. Furthermore, the paper sheet (design paper sheet) used for designing the output profile is a paper sheet having a fluorescent characteristic (that is, a paper sheet containing a large amount of an optical brightening agent), and the image output apparatus used for designing is any apparatus having any kind of color characteristic. Therefore, in each of the following embodiments, a target is the absolute color value defined by the source profile in which the standard of Fogra 51 is set, and a target value is the absolute color value to be reproduced by the output result on the design paper sheet (the output result of the image output apparatus used for the designing). Furthermore, the matching result of color matching is the correction result obtained by attempting to reproduce the target value, and a white point is the white absolute color value (white color value) of the image output apparatus used for the designing. However, the source profile is not limited to a profile in which the standard of Fogra 51 is set; a profile in which any standard is set may be used, as long as the standard defines calorimetric measurement by a light source including ultraviolet rays.

<Colorimetric Results of Paper with Different Optical Brightening Agent Contents>

Furthermore, as described above, when calorimetric measurement is performed on a paper sheet (OBA paper) having a fluorescent characteristic by using a colorimeter, there are cases where the color is measured to be bluer than the color perceived subjectively. Thus, calorimetric results were obtained by performing calorimetric measurement using a colorimeter, on a paper sheet A containing almost no optical brightening agent and a paper sheet B containing a large amount of an optical brightening agent, under two different light sources (M0 and M1). The obtained calorimetric results were plotted on an ab coordinate plane in a Lab uniform color space, as illustrated in FIG. 1. Note that M0 is a light source including almost no ultraviolet rays, and M1 is a light source including ultraviolet rays.

As illustrated in FIG. 1, the results of colorimetric measurement under the M0 light source are almost matching between the paper sheet A and the paper sheet B, while the results of colorimetric measurement under the M1 light source indicate that the color value of the paper sheet B is bluer than that of the paper sheet A. On the other hand, the optical brightening agent absorbs ultraviolet rays and turns the ultraviolet rays into visible bluish white light (fluorescence), so that the whiteness of the appearance of this bluish white light is increased. Accordingly, a paper sheet having a fluorescent characteristic may be measured to be bluer than the color perceived subjectively. For this reason, in the related art, there have been cases where color fogging into yellow occurs in the achromatic color vicinity gamut.

<Reason why Yellow Color Fogging Occurs>

Figure 2:
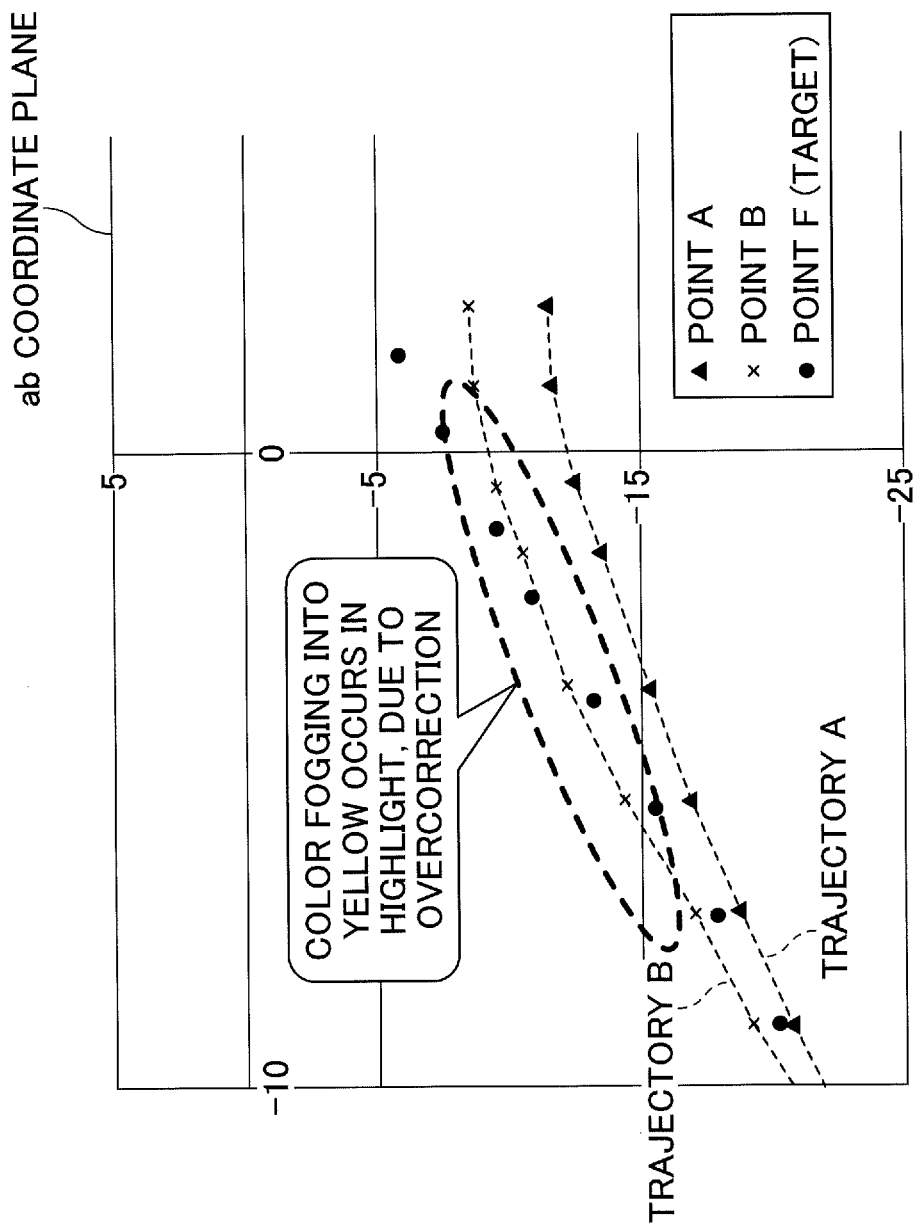
FIG. 2 is a diagram for describing an example of a case where color fogging into yellow occurs due to overcorrection according to the related art.

With respect to the reason why color fogging into yellow occurs in the achromatic color vicinity gamut, as an example, color matching of cyan will be described with reference to FIG. 2. FIG. 2 is a diagram for describing an example of a case where color fogging into yellow occurs due to overcorrection.

It is assumed that point A is the reproduction color on a design paper sheet, and point F is a corresponding color defined by Fogra 51. Furthermore, the subjective reproduced color of the point A, is point B. Among the points A, the points F, and the points B, the point having the largest a* coordinate value in the ab plane is the white point. On the other hand, as the a* coordinate value decreases, the reproduced color approaches 100% cyan. In this case, in the related art, target values have been set as the trajectory A with reference to the white point of the points A. That is, near the achromatic color, the trajectory A, which are color values after the relative color conversion, are set as the target values, and near the chromatic color, the points F (target) are set as the target values. Note that when a certain color (for example, CMYK data indicating one CMYK value) is given, one point A, one point B, and one point F corresponding to this certain color are respectively determined.

However, when there is a divergence between the appearance and color value (colorimetric value under a M1 light source) as in the case of a paper sheet having a fluorescent characteristic, it appears as if relative color conversion is performed with reference to the white point of the subjective points B, and the appearance of the matching result becomes the trajectory B. That is, for example, the ink is placed near a solid part, and, therefore, the reproduced color is close to the target, whereas in the intermediate color gamut from the highlight where the paper ground is exposed, overcorrection is performed on the target. Accordingly, color fogging into yellow occurs in the intermediate color gamut (achromatic color vicinity gamut) from the highlight where the paper ground is exposed.

<Color Management System>

Figure 3:
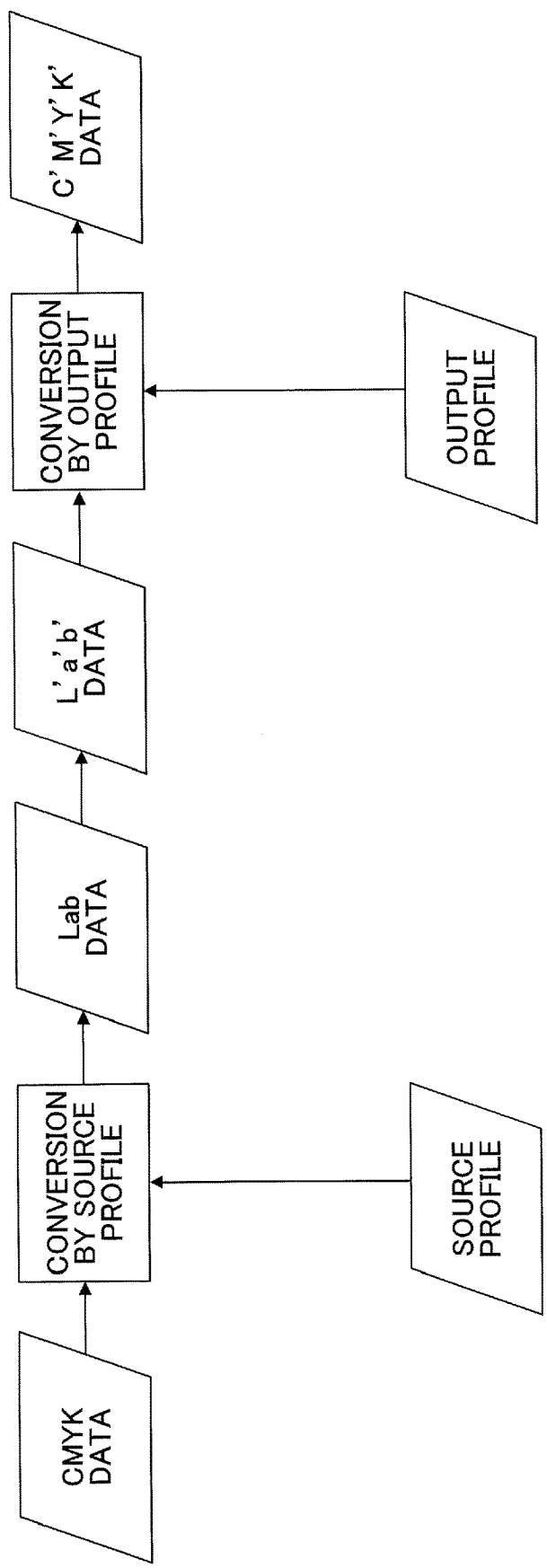
FIG. 3 is a diagram for describing an example of a color management system according to the related art.

Here, in each embodiment of the present invention, a description is given of a case where a target value is set so as to obtain a matching result that does not cause the above-described color fogging in the achromatic color vicinity gamut, even for paper with a strong fluorescent characteristic, and an output profile realizing this matching result is generated. Therefore, an outline of the color management system used for designing the output profile will be described with reference to FIG. 3. FIG. 3 is a diagram for describing an example of a color management system.

As illustrated in FIG. 3, the CMYK data, which is the color data of the reproduction source, is converted, by a source profile, into Lab data, which is a relative color value. For example, when the standard of Fogra 51 is set in the source profile, the CMYK data is subjected to relative color conversion with respect to the white point of Fogra 51. Note that the source profile is, for example, a lookup table (first LUT) in which Lab data is associated with CMYK data. Conversion from CMYK data to Lab data can be performed by a known interpolation method by using the first LUT. Note that the CMYK data may be converted into XYZ data expressed in an XYZ color system, for example.

Furthermore, as illustrated in FIG. 3, the L'a'b' data as the color data to be converted, is converted, by an output profile, into C'M'Y'K' data that is color data of the reproduction destination. Note that the output profile is, for example, a lookup table (second LUT) in which L'a'b' data is associated with C'M'Y'K' 'data. Conversion from the C'M'Y'K' data to the Lab data can be performed by a known interpolation method by using the second LUT.

Here, the conversion by the source profile and the conversion by the output profile are relative color conversion according to the definition of ICC, and, therefore, the Lab data converted by the source profile is directly taken as the L'a'b' data to be converted by the output profile.

Note that the CMYK data and the C'M'Y'K' data are data in which the respective channels have discrete values.

First Embodiment

Hereinafter, a first embodiment of the present invention will be described. In the present embodiment, a description is given of a profile generation system 1 that sets a target value so as to obtain a matching result that does not cause color fogging in the achromatic color vicinity gamut even for paper with a strong fluorescent characteristic, and that generates an output profile that realizes this matching result.

<Outline of Target Value Setting-First Embodiment>

Figure 4:
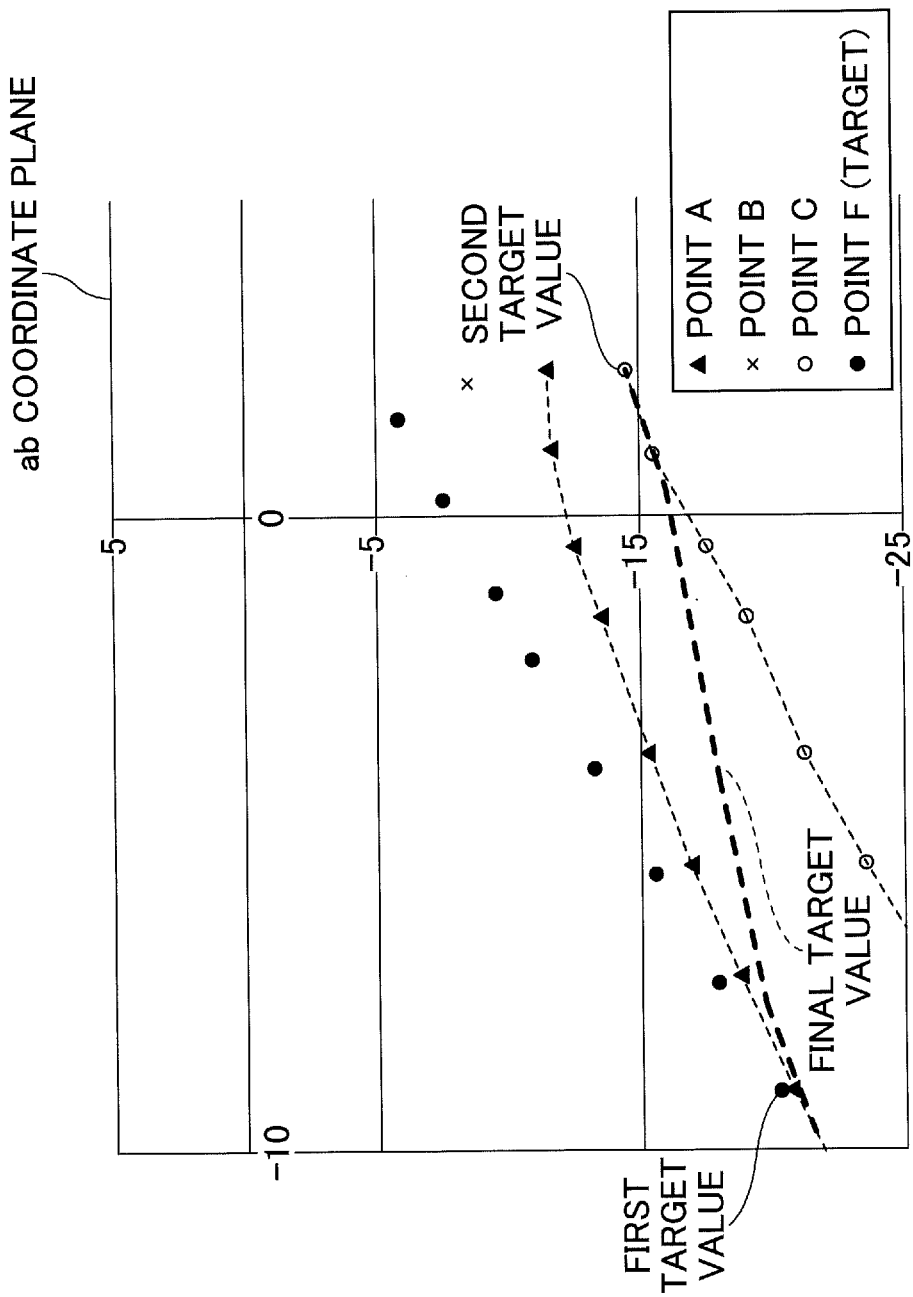
FIG. 4 is a diagram for describing an outline of target value setting according to a first embodiment of the present invention.

First, the outline of target value setting according to the present embodiment will be described with reference to FIG. 4. FIG. 4 is a diagram for describing the outline of target value setting.

FIG. 4 illustrates an ab coordinate plane, in which point A is the reproduced color on the design paper sheet, point B is the subjective reproduced color, and point F is the target (that is, a color defined by Fogra 51). Among the points A, the points F, and the points B, the point having the largest a* coordinate value in the ab coordinate plane is the white point.

In this case, in the present embodiment, a new white reference point C is set along an extended line between the white point of point B and the white point of point A. This white reference point C is set on a coordinate point that substantially opposes the white point of the point B with respect to the white point of the point A (for example, a coordinate point that is point-symmetric with the white point of the point B with respect to the white point of the point A, or a coordinate point near such a coordinate point).

Next, two target values (first target value and second target value) are set as preprocessing for setting the final target value. In the chromatic color gamut, the target (point F) is directly taken as the first target value. On the other hand, in the achromatic color vicinity gamut, a value obtained by subjecting the target (point F) to white conversion by using the white reference color value, is taken as the second target value.

Then, in the intermediate gamut between the chromatic color gamut and the achromatic color vicinity gamut, interpolation is performed by using the first target value and the second target value, and the final target value is set such that the value shifts from the first target value to the second target value as the position shifts from the achromatic color vicinity gamut to the chromatic color gamut. This final target value is a target value by which it is possible to obtain a matching result that does not cause color fogging in the achromatic color vicinity gamut even on paper with a strong fluorescent characteristic.

<First Target Value and Second Target Value—First Embodiment>

Here, a method of obtaining the first target value and the second target value will be described. Note that the color conversion for obtaining the second target value is performed in the XYZ color system. A known technique may be used for the color conversion between the Lab color system and the XYZ color system.

First, the target is an absolute color value obtained by dividing the XYZ tristimulus value defined by the source profile, by a color value (hereinafter also referred to as "D50 white") obtained by measuring the perfectly diffusing plate under the reference illumination of D50. That is, the target value $(X_T, Y_T, Z_T)$ is expressed by the following formula 1, where the XYZ tristimulus value of D50 white is $(X_{D50W}, Y_{D50W}, Z_{D50W})$, and the XYZ tristimulus value defined by the source file is $(X_S, Y_S, Z_S)$.

$$(X_T, Y_T, Z_T) = (X_S/X_{D50W}, Y_S/Y_{D50W}, Z_S/Z_{D50W}) \quad \text{(formula 1)}$$

The first target value $(X_{OUT1}, Y_{OUT1}, Z_{OUT1})$ is expressed by the following formula 2, because the target in the chromatic color gamut is directly set.

$$(X_{OUT1}, Y_{OUT1}, Z_{OUT1}) = (X_T, Y_T, Z_T) \quad \text{(formula 2)}$$

The second target value $(X_{OUT2}, Y_{OUT2}, Z_{OUT2})$, is expressed by the following formula 3, where the XYZ tristimulus value of the white point defined by the source profile is $(X_{SW}, Y_{SW}, Z_{SW})$ and the tristimulus value of the white reference (point C) is $(X_C, Y_C, Z_C)$.

$$(X_{OUT2}, Y_{OUT2}, Z_{OUT2}) = (X_T X_C/X_{SW}, Y_T Y_C/Y_{SW}, Z_T Z_C/Z_{SW}) \quad \text{(formula 3)}$$

Thus, the first target value and the second target value are obtained. Note that the method of obtaining the final target value by interpolation by using the first target value and the second target value will be described later.

<Overall Configuration of Profile Generation System 1—First Embodiment>

Figure 5:
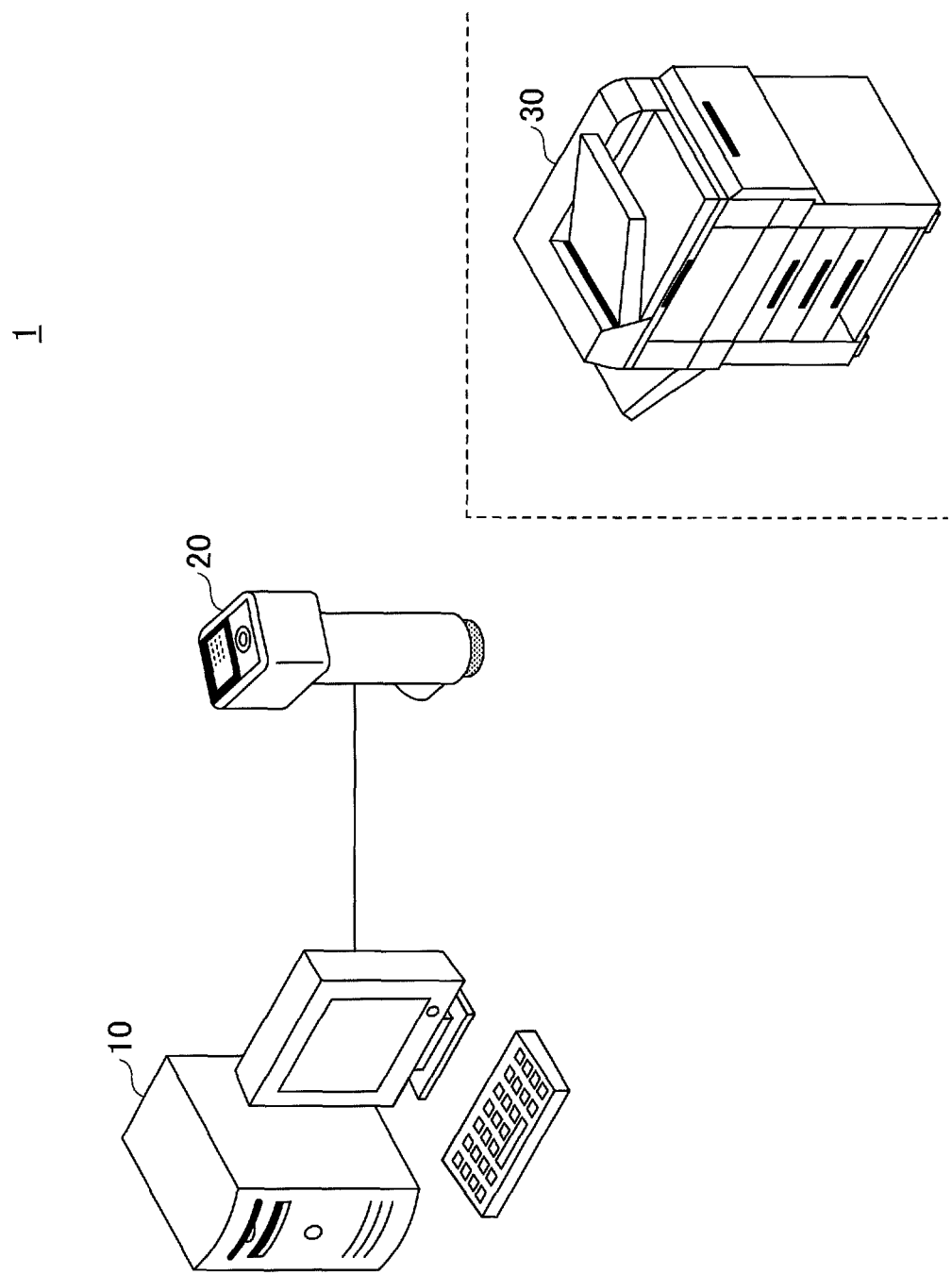
FIG. 5 is a diagram illustrating an example of the overall configuration of a profile generation system according to the first embodiment of the present invention.

Next, the overall configuration of the profile generation system 1 according to the present embodiment will be described with reference to FIG. 5. FIG. 5 is a diagram illustrating an example of the overall configuration of the profile generation system 1 according to the first embodiment.

As illustrated in FIG. 5, the profile generation system 1 according to the present embodiment includes a profile generation apparatus 10 and a colorimeter 20. The profile generation apparatus 10 and the colorimeter 20 are communicably connected, for example, by a Universal Serial Bus (USB) or a network, etc.

The profile generation apparatus 10 is, for example, a personal computer (PC), etc., and sets the above-described target value, and generates an output profile for an image output apparatus 30 that is a design target. Then, the profile generation apparatus 10 outputs the generated output profile to an image output apparatus 30. Note that the method of outputting the output profile is not limited. The output profile may be output to the image output apparatus 30 via a USB cable or a network, etc., or may be output to the image output apparatus 30 via a recording medium, etc. Furthermore, the output destination is not necessarily the image output apparatus 30; for example, the output destination may be an auxiliary storage device of the profile generation apparatus 10 or another device, etc.

Note that the image output apparatus 30 that is a design target may be any apparatus that outputs a color image onto a design paper sheet, and examples thereof include a color copy machine, a color printer, and a multifunction peripheral, etc.

The colorimeter 20 is a device that obtains color values by performing colorimetric measurement on the color image (that is, color printed matter) output on a design paper sheet by the image output apparatus that is a design target. Note that it is assumed that the colorimeter 20 performs colorimetric measurement based on the colorimetric measurement conditions according to the standard of Fogra 51.

Note that the configuration of the profile generation system 1 illustrated in FIG. 5 is merely an example, and other configurations may be adopted, for example, the profile generation apparatus 10 may be a system formed of a plurality of computers.

<Hardware Configuration of Profile Generation Apparatus 10—First Embodiment>

Figure 6:
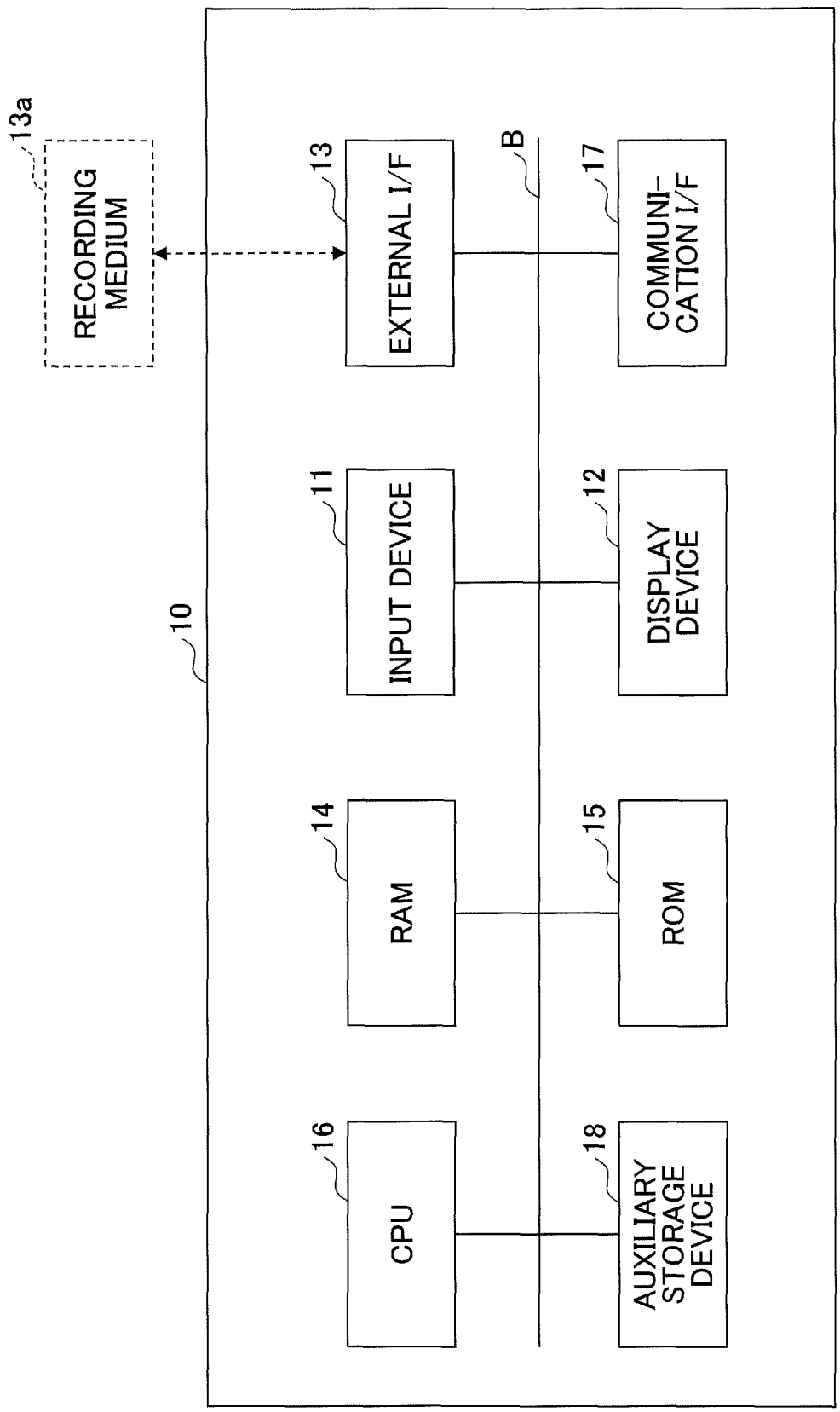
FIG. 6 is a diagram illustrating an example of a hardware configuration of a profile generation apparatus according to the first embodiment of the present invention.

Next, the hardware configuration of the profile generation apparatus 10 according to the present embodiment will be described with reference to FIG. 6. FIG. 6 illustrates an example of the hardware configuration of the profile generation apparatus 10 according to the first embodiment.

As illustrated in FIG. 6, the profile generation apparatus 10 according to the present embodiment includes an input device 11, a display device 12, an external interface (I/F) 13, and a Random Access Memory (RAM) 14. Furthermore, the profile generation apparatus 10 according to the present embodiment includes a Read-Only Memory (ROM) 15, a Central Processing Unit (CPU) 16, a communication I/F 17, and an auxiliary storage device 18. Each of these hardware elements is connected to a bus B so as to communicate with each other.

The input device 11 is, for example, a keyboard, a mouse, and a touch panel, etc., and is used by the user to input various operations, etc. The display device 12 is, for example, a display, etc., and displays processing results obtained by the profile generation apparatus 10. The profile generation apparatus 10 may not necessarily include at least one of the input device 11 and the display device 12.

The external I/F 13 is an interface for an external device. An external device is, for example, a recording medium 13a, etc. The profile generation apparatus 10 can read data from or write data in the recording medium 13a, etc., via the external I/F 13.

Examples of the recording medium 13a include a flexible disk, a Compact Disc (CD), a Digital Versatile Disk (DVD), a Secure Digital (SD) memory card, and a USB memory card, etc.

The RAM 14 is a volatile semiconductor memory that temporarily stores programs and data. The ROM 15 is a nonvolatile semiconductor memory capable of holding programs and data even when the power is turned off. In the ROM 15, for example, Operating System (OS) settings and network settings, etc., are stored.

The CPU 16 is an arithmetic device that reads programs and data from the ROM 15 and the auxiliary storage device 18, etc., and loads the programs and data in the RAM 14, and executes processes.

The communication I/F 17 is an interface through which the profile generation apparatus 10 communicates with another apparatus (for example, the colorimeter 20, etc.).

The auxiliary storage device 18 is a nonvolatile storage device that stores programs and data, and examples of the auxiliary storage device 18 are a Hard Disk Drive (HDD) and a Solid State Drive (SSD), etc. The programs and data stored in the auxiliary storage device 18 include, for example, an OS, application software for implementing various functions on the OS, and programs for implementing each function of the profile generation apparatus 10, etc.

The profile generation apparatus 10 according to the present embodiment has the hardware configuration illustrated in FIG. 6, and is therefore capable of implementing various processes to be described later.

<Functional Configuration of Profile Generation Apparatus 10—First Embodiment>

Figure 7:
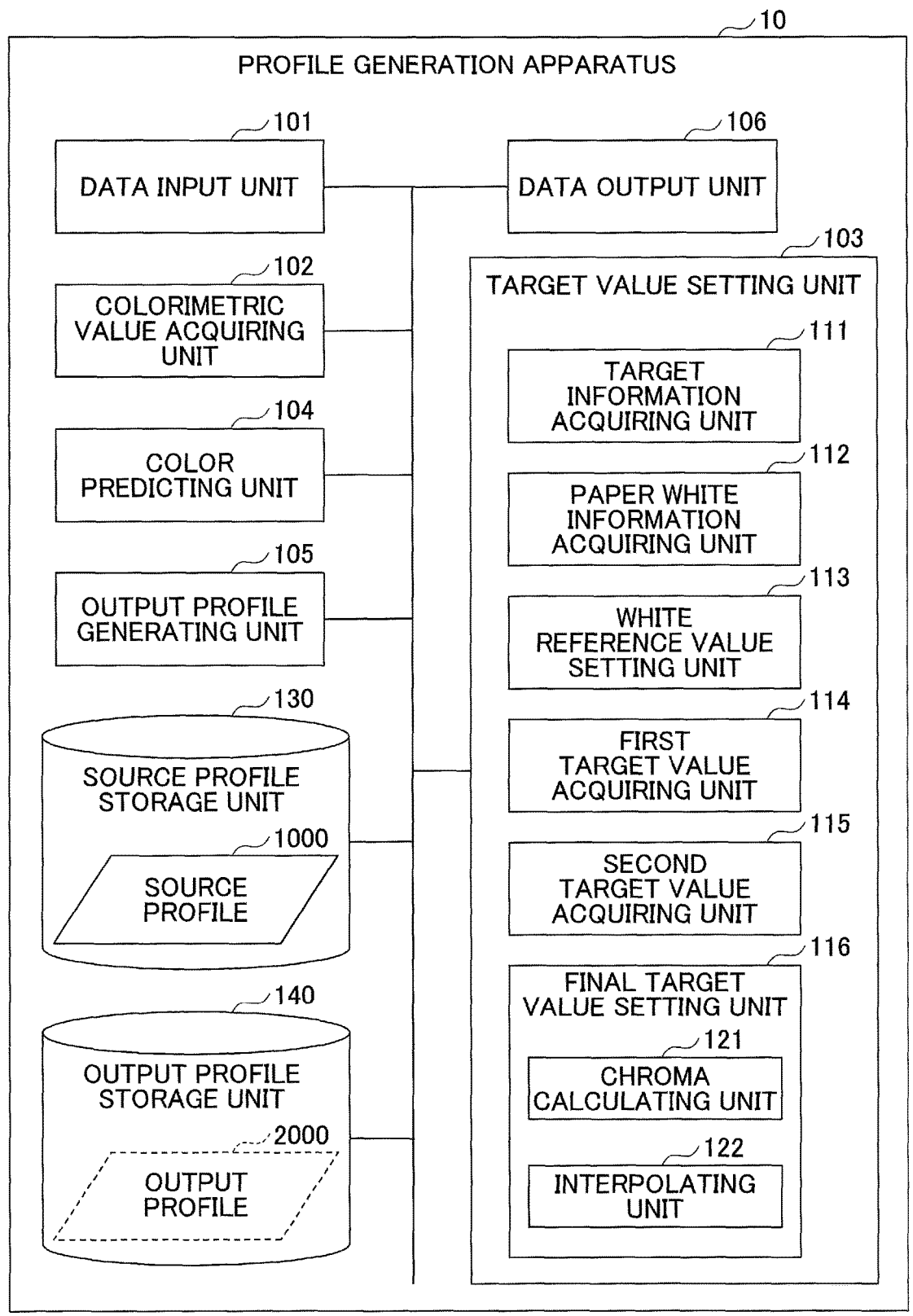
FIG. 7 is a diagram illustrating an example of a functional configuration of the profile generation apparatus according to the first embodiment of the present invention.

Next, the functional configuration of the profile generation apparatus 10 according to the present embodiment will be described with reference to FIG. 7. FIG. 7 is a diagram illustrating an example of the functional configuration of the profile generation apparatus 10 according to the first embodiment.

As illustrated in FIG. 7, the profile generation apparatus 10 according to the present embodiment includes a data input unit 101, a colorimetric value acquiring unit 102, a target value setting unit 103, a color predicting unit 104, an output profile generating unit 105, and a data output unit 106. These units are implemented by processes that one or more programs installed in the profile generation apparatus 10 cause the CPU 16 to execute.

Furthermore, the profile generation apparatus 10 according to the present embodiment includes a source profile storage unit 130 and an output profile storage unit 140. These units can be implemented by using, for example, the auxiliary storage device 18. Note that at least one of the source profile storage unit 130 and the output profile storage unit 140 may be implemented by using a storage device, etc., connected to the profile generation apparatus 10 via a network, etc.

The data input unit 101 acquires CMYK data to be input. The colorimetric value acquiring unit 102 acquires colorimetric values measured by the colorimeter 20 under predetermined colorimetric conditions.

The target value setting unit 103 sets a target value in color matching. Here, the target value setting unit 103 includes a target information acquiring unit 111, a paper white information acquiring unit 112, a white reference value setting unit 113, a first target value acquiring unit 114, second target value acquiring unit 115, and a final target value setting unit 116 (an example of a target value setting unit).

The target information acquiring unit 111 acquires a target in color matching, from a source profile 1000 stored in the source profile storage unit 130. The paper white information acquiring unit 112 acquires the white point of the design paper sheet. The white reference value setting unit 113 sets a white reference point (point C described with reference to FIG. 4) in consideration of the white point. The first target value acquiring unit 114 acquires a first target value. The second target value acquiring unit 115 acquires a second target value.

The final target value setting unit 116 generates and sets the final target value from the first target value and the second target value. The final target value setting unit 116 includes a chroma calculating unit 121 and an interpolating unit 122. The chroma calculating unit 121 calculates the chroma of the second target value. The interpolating unit 122 interpolates the target value in the intermediate color gamut between the chromatic color gamut and the achromatic color vicinity gamut, according to the chroma of the second target value. Note that the final target value is Lab data that is an absolute color value.

The color predicting unit 104 predicts the color value of color printed matter output by the image output apparatus 30. The output profile generating unit 105 generates an output profile 2000 by associating a relative color value obtained by performing relative color conversion by using the source profile 1000, and a relative color value corresponding to the Lab data that is the final target data. The generated output profile 2000 is stored in the output profile storage unit 140.

The data output unit 106 outputs the output profile 2000 stored in the output profile storage unit 140.

<Output Profile Generation Process-First Embodiment>

Figure 8:
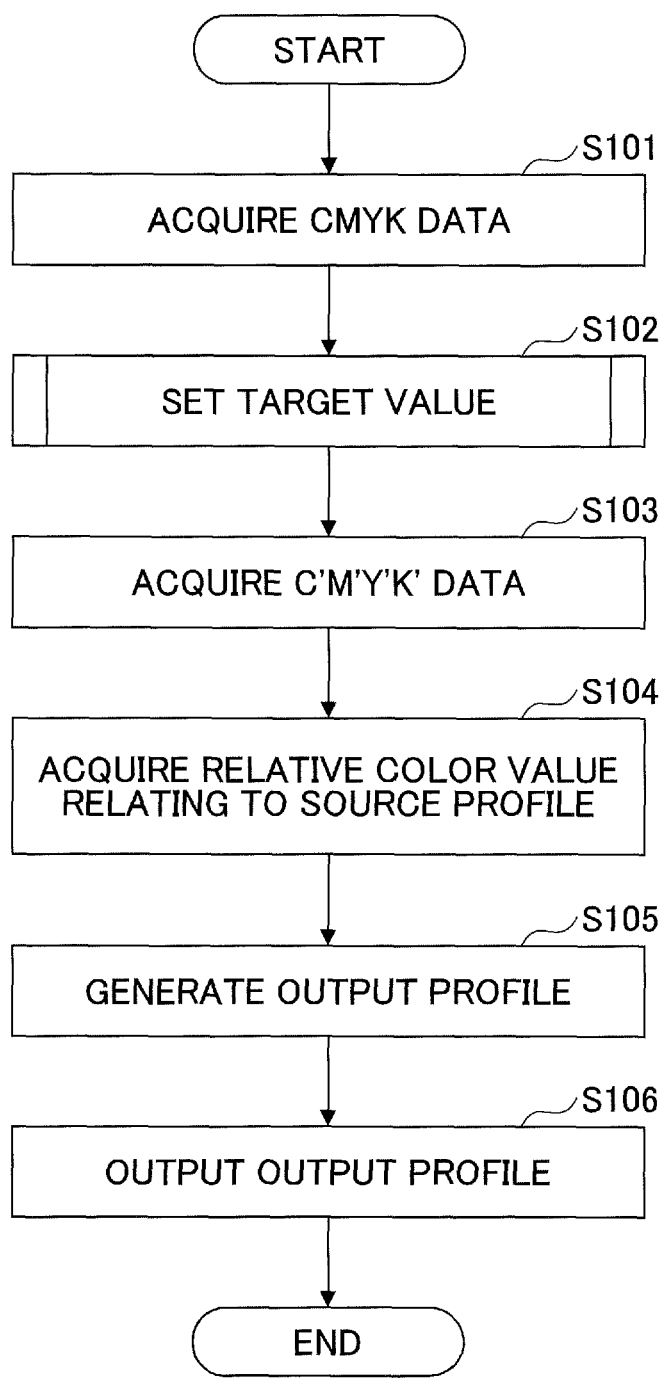
FIG. 8 is a flowchart illustrating an example of a profile generation process according to the first embodiment of the present invention.

Next, an output profile generation process according to the first embodiment will be described with reference to FIG. 8. FIG. 8 is a flowchart illustrating an example of an output profile generation process according to the first embodiment.

Step S101: The data input unit 101 acquires CMYK data to be input. The CMYK data is expressed by lattice points in the CMYK color space. The profile is formed of an LUT, and, therefore, the data input unit 101 acquires CMYK data formed of, for example, CMYK values of 8 bits and 9 slice lattice points (C, M, Y, K)=(0, 0, 0, 0), (0, 0, 0, 32), . . . , (0, 0, 0, 255), (0, 0, 32, 0), . . . , (255, 255, 255, 255).

Step S102: Next, the target value setting unit 103 sets a target value (final target value) for the CMYK data acquired by the data input unit 101. These final target values are expressed by Lab data formed of Lab values (absolute color values) respectively corresponding to the CMYK values (relative color values) included in the CMYK data. Note that details of the process of setting a target value will be described later.

Step S103: Next, the color predicting unit 104 acquires the C'M'Y'K' data corresponding to the Lab data. That is, the output profile generating unit 105 converts each of the Lab values included in the Lab data into a C'M'Y'K' value, to acquire the C'M'Y'K' data. That is, the output profile generating unit 105 converts an absolute color value (Lab value) into a relative color value (C'M'Y'K' value).

Step S104: Next, the color predicting unit 104 acquires the relative color value relating to the source profile 1000 stored in the source profile storage unit 130. That is, the color predicting unit 104 uses the source profile 1000 to perform relative color conversion on each CMYK value forming the CMYK data acquired by the data input unit 101, to acquire a relative color value.

Step S105: Next, the output profile generating unit 105 generates the output profile 2000 by associating each of the relative color values acquired in the above-described step S104, with a C'M'Y'K' value (relative color value) corresponding to the CMYK value at the conversion source of the acquired relative color value. Then, the output profile generating unit 105 stores the generated output profile 2000 in the output profile storage unit 140.

Step S106: Finally, the data output unit 106 outputs the output profile 2000 stored in the output profile storage unit 140.

As described above, the output profile 2000 is generated by the profile generation apparatus 10 according to the present embodiment. In this case, the profile generation apparatus 10 according to the present embodiment can generate the output profile 2000 that can realize a matching result that does not cause color fogging in the achromatic color vicinity gamut even with paper having a strong fluorescence characteristic (that is, the output profile 2000 that reproduces a target without deviation from subjective perception), by setting the target value described later.

<Process of Setting Target Value—First Embodiment>

Figure 9:
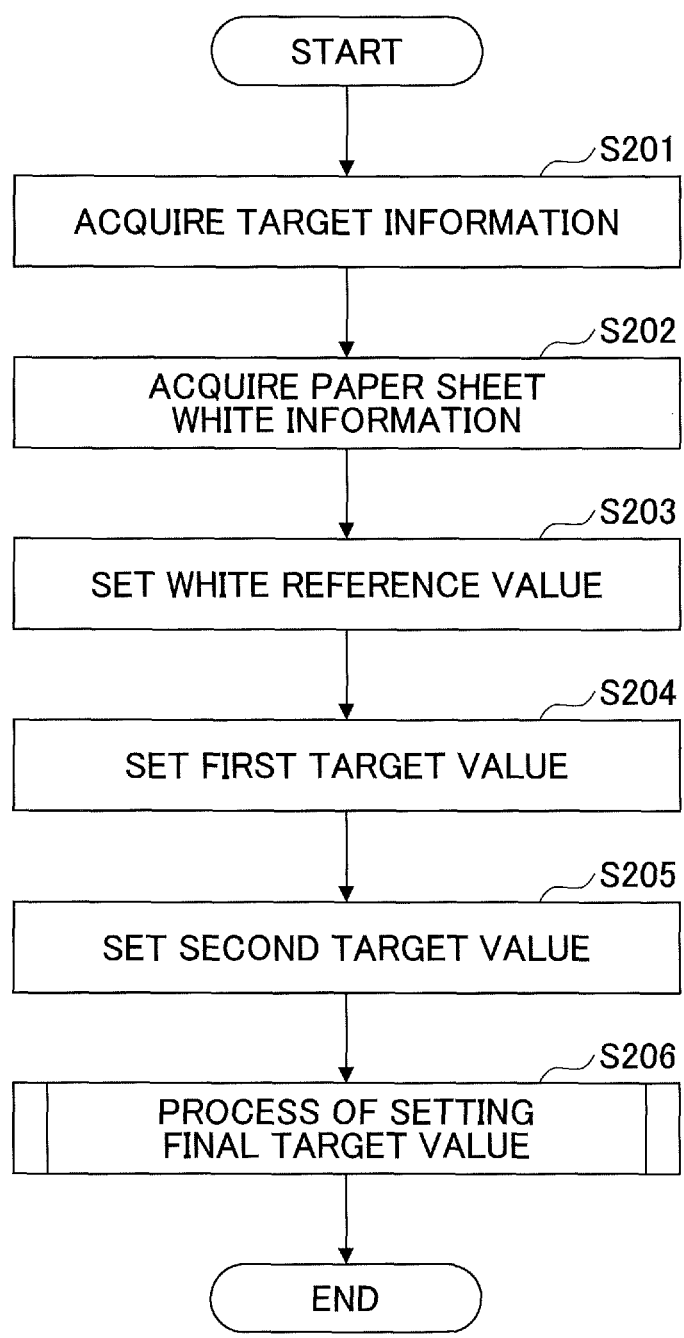
FIG. 9 is a flowchart illustrating an example of a target value setting process according to the first embodiment of the present invention.

Hereinafter, the details of the target value setting process at step S102 will be described with reference to FIG. 9. FIG. 9 is a flowchart illustrating an example of the target value setting process according to the first embodiment.

Step S201: The target information acquiring unit 111 acquires, as a target, an absolute color value (Lab value) corresponding to the CMYK value included in the CMYK data acquired by the data input unit 101. The target information acquiring unit 111 may acquire the absolute color value corresponding to the CMYK value by performing absolute color conversion on the CMYK value, by the source profile 1000. Note that, for example, when an absolute color value is stored in the auxiliary storage device 18, etc., together with the source profile 1000, the target information acquiring unit 111 may use this stored absolute color value.

Step S202: The paper white information acquiring unit 112 acquires the white point of the design paper sheet. That is, first, the colorimetric value acquiring unit 102 acquires a colorimetric value obtained as a result of the colorimeter 20 performing calorimetric measurement on the design paper sheet under the colorimetric conditions defined by the source profile 1000. Then, the paper white information acquiring unit 112 acquires the colorimetric value (Lab value that is an absolute color value) acquired by the colorimetric value acquiring unit 102, and sets this colorimetric value as a white point. Accordingly, information on the white point (for example, point A in FIG. 4) of the design paper sheet is obtained for each of the CMYK values included in the CMYK data. Note that the white point of the design paper sheet, on which colorimetric measurement is performed under the calorimetric measurement condition defined in the source profile 1000, may be stored in the source profile storage unit 130 in advance.

Note that in the case where the standard of Fogra 51 is set in the source profile 1000, calorimetric measurement is performed on the design paper sheet by using M1 as the colorimetric light source.

Step S203: The white reference value setting unit 113 sets the white reference point in consideration of the white point. Note that the white point is acquired by the method described in the above with respect to step S202, and, therefore, considering the white point means considering the fluorescence characteristic of the design paper sheet.

The coordinates (that is, the white reference value) of the white reference point (for example, point C in FIG. 4) may be set on a subjective basis, but may be set by the following method 1 or 2.

(Method 1)

Method 1 is a method of setting a white reference value by using two pieces of information obtained by performing colorimetric measurement under different colorimetric conditions.

The fluorescence characteristic can be expressed by the difference between the color value measured by using the colorimetric light source M2 and the color value measured by using the colorimetric light source M1. Note that the colorimetric light source M2 is a colorimetric measurement light source that does not include ultraviolet rays.

Figure 10:
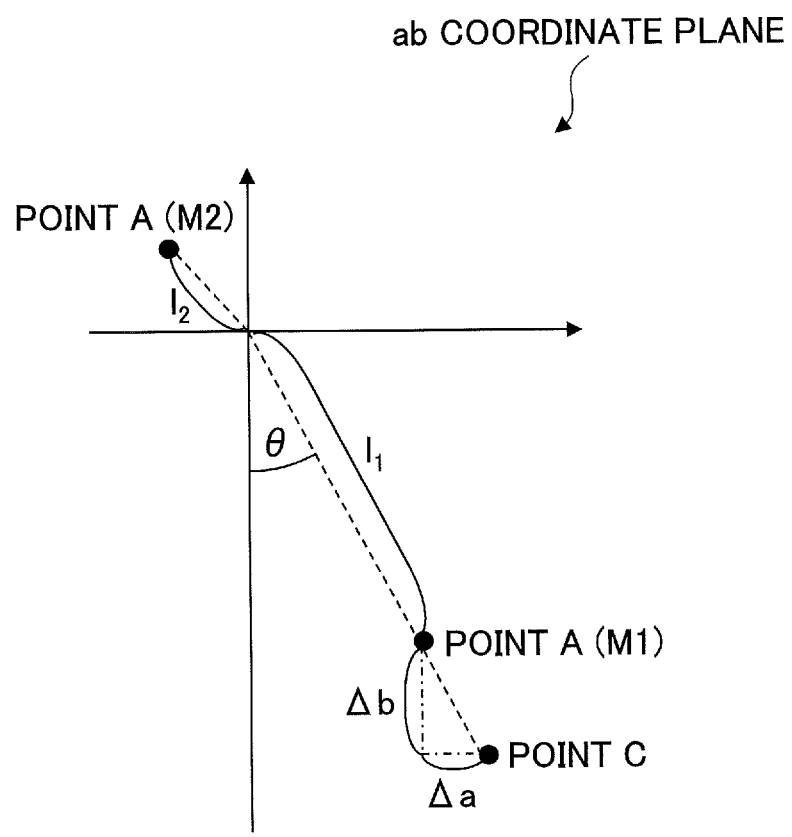
FIG. 10 is a diagram (part 1) for describing an example of a method of setting a white reference value according to the first embodiment of the present invention.

As illustrated in FIG. 10, the white point obtained by performing colorimetric measurement on the design paper sheet with the colorimetric light source M1 is referred to as point A (M1), and the white point obtained by performing colorimetric measurement on the same design paper sheet with the colorimetric light source M2 is referred to as point A (M2). Furthermore, the coordinates of point A (M1) are $(L_A, a_A, b_A)$, the coordinates (white reference value) of point C that is the white reference are $(L_C, a_C, b_C)$, the distance from the origin to point A (M1) in the ab coordinate plane is $l_1$, and the distance from the origin to point A (M2) in the ab coordinate plane is $l_2$. Furthermore, the white reference value $(L_C, a_C, b_C)$ is expressed by the following formula 4, where the angle between the b axis and a line segment connecting point A (M1) with the origin, is $\theta$.

$$L_C = L_A, a_C = a_A + \Delta a, b_C = b_A - \Delta b \qquad \text{(formula 4)}$$

Here, $\Delta a = ((l_1 - l_2)/\alpha) * \sin\theta$, $\Delta b = ((l_1 - l_2)/\alpha) * \cos\theta, \theta = \tan^{-1}(\text{abs}(a_A)/\text{abs}(b_A))$.

Note that $\alpha$ is a parameter, and abs (·) expresses an absolute value.

That is, point C is set on the extended line of a straight line connecting the origin and point A (M1), or in the blue color gamut direction near the hue $\theta \pm \Delta\eta$ in the figure. Any value may be set as $\alpha$ according to the type and characteristics of the design paper sheet; however, it is preferable to set the value, for example, to be between 8.0 and 10.0. The fluorescence characteristic is substantially proportional to the extent of the difference between the distance $l_1$ and the distance $l_2$, and, therefore, the correction amounts $\Delta a$ and $\Delta b$ corresponding to the extent of the fluorescence characteristic can be set. Furthermore, $\Delta\eta$ can also be set according to the type and characteristics of the design paper sheet; however, it is preferable to set the value, for example, to be 3.0 to 5.0 (degrees).

(Method 2)

Method 2 is a method of setting the white reference value according to the white point of the design paper sheet on which colorimetric measurement is performed by using the colorimetric light source M1, and the distance from the white point of the target.

Figure 11:
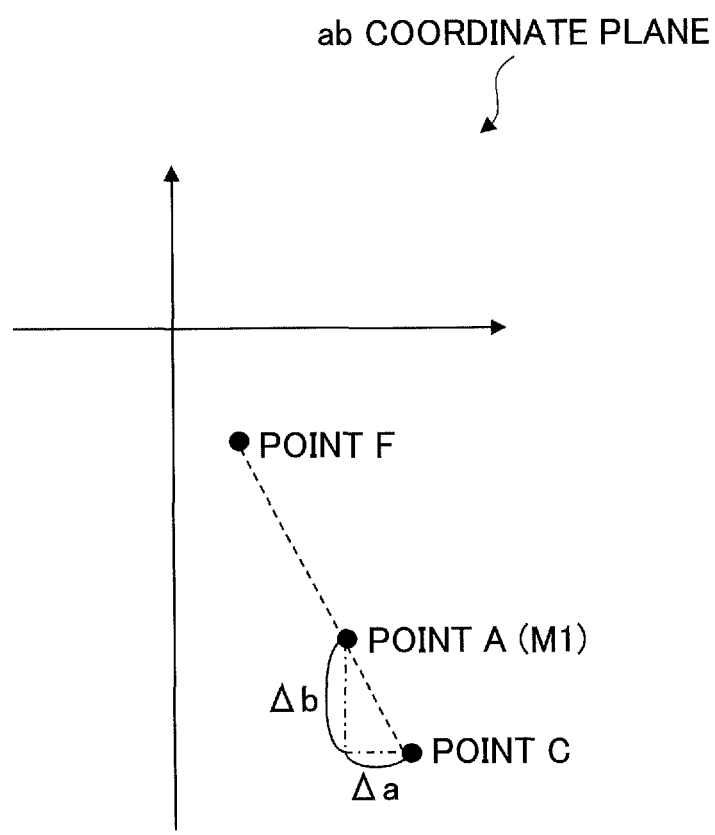
FIG. 11 is a diagram (part 2) for describing an example of a method of setting a white reference value according to the first embodiment of the present invention.

As illustrated in FIG. 11, the white point obtained by performing colorimetric measurement on the design paper sheet by using the colorimetric light source M1 is point A (M1), and the white point of the target is point F. Furthermore, the white reference value $(L_C, a_C, b_C)$ is expressed by the following formula 5, where the coordinates of point A (M1) are $(L_A, a_A, b_A)$, the coordinates of point C (white reference value) that is the white reference are $(L_C, a_C, b_C)$, and the coordinates of point F are $(L_F, a_F, b_F)$.

$$L_C = L_A, a_C = a_A + \Delta a, b_C = b_A + \Delta b \qquad \text{(formula 5)}$$

Here, $\Delta a = (a_A - a_F)/\beta$, $\Delta b - (b_A - b_F)/\beta$.

Note that $\beta$ is a parameter.

That is, point C is set in the blue color gamut direction on the extended line of the straight line connecting point F and point A (M1). As $\beta$, any value may be set according to the type and characteristic of the design paper sheet; however, it is preferable to set the value, for example, to be between 3.0 and 4.0. If the appearance of the paper is white, the fluorescence characteristic is substantially proportional to the distance between point F and point A, and, therefore, it is possible to set the correction amounts $\Delta a$ and $\Delta b$ corresponding to the extent of the fluorescence characteristic. Note that method 2 is particularly effective when there is no environment for performing colorimetric measurement by using the colorimetric light source M2, as compared to method 1.

Accordingly, for each CMYK value included in the CMYK data, the value (white reference value) of the white reference point (for example, point C in FIG. 4) is obtained.

Step S204: The first target value acquiring unit 114 acquires the first target value. That is, by the above formula 2, the first target value acquiring unit 114 acquires the absolute color value (that is, the target) corresponding to the CMYK value included in the CMYK data acquired by the data input unit 101, as the first target value. Note that formula 2 is an XYZ tristimulus value, and, therefore, an absolute color value (Lab value) is to be converted into a XYZ tristimulus value by a known method. However, with respect to setting the first target value, an absolute color value can be directly taken as the first target value, and, therefore, there is no need to convert the absolute color value into a XYZ tristimulus value. Accordingly, a first target value $(X_{out1}, Y_{out1}, Z_{out1})$ is obtained for each CMYK value included in the CMYK data.

Step S205: The second target value acquiring unit 115 acquires the second target value corresponding to the first target value. That is, by the above formula 3, the second target value acquiring unit 115 acquires the second target value by using the white reference value set in the above-described step S203, and the coordinate values of the white point defined by the source profile 1000. Note that the white reference value set in the above-described step S203 is an absolute color value (Lab value), and, therefore, the absolute color value is to be converted into a XYZ tristimulus value by a known method. Furthermore, if the coordinate values of the white point defined by the source profile 1000 are XYZ tristimulus values, these values can be directly used. If the coordinate values of the white point defined by the source profile 1000 are Lab values, the Lab values are to be converted into XYZ tristimulus values by a known method. Accordingly, a second target value $(X_{out2}, Y_{out2}, Z_{out2})$ can be obtained with respect to each of the CMYK values included in the CMYK data.

Step S206: The final target value setting unit 116 generates and sets the final target value from the first target value and the second target value. In the intermediate color gamut between the achromatic color vicinity gamut and the chromatic color gamut, the final target value is generated by performing linear interpolation by using the first target value and the second target value. In the achromatic color vicinity gamut and the chromatic color gamut, the final target value is generated by adopting the first target value and the second target value, respectively.

Figure 12:
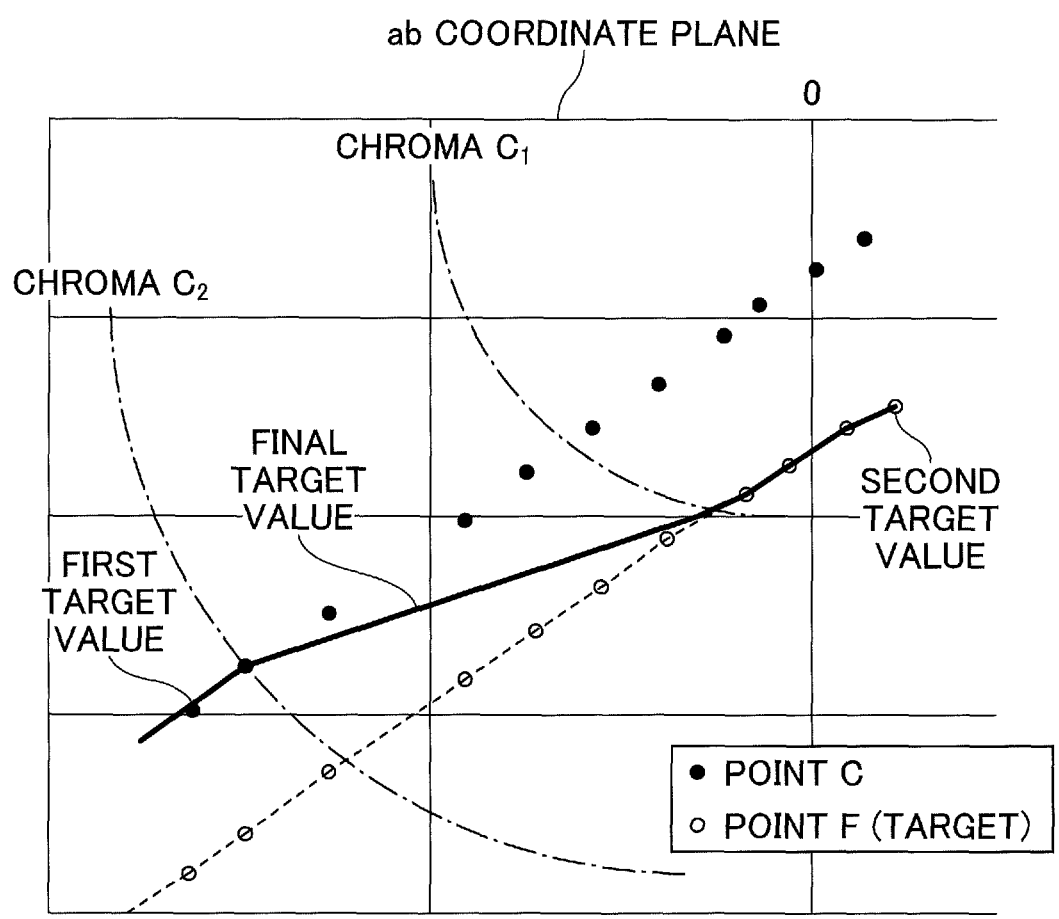
FIG. 12 is a diagram for describing an example of interpolation of a target value by linear interpolation according to the first embodiment of the present invention.

Here, a case where the final target value is generated and set by linear interpolation will be described with reference to FIG. 12. FIG. 12 is a diagram for describing an example of interpolation of a target value by linear interpolation.

As illustrated in FIG. 12, in the gamut where the chroma is less than $C_1$, the final target value setting unit 116 sets the second target value as the final target value. Furthermore, in the gamut where the chroma is $C_2$ or more, the final target value setting unit 116 sets the first target value as the final target value. On the other hand, in the intermediate gamut where the chroma is $C_1$ or more and less than $C_2$, the final target value setting unit 116 sets a linear interpolation value (third target value) of the first target value and the second target value, as the final target value.

<Process of Setting Final Target Value—First Embodiment>

Figure 13:
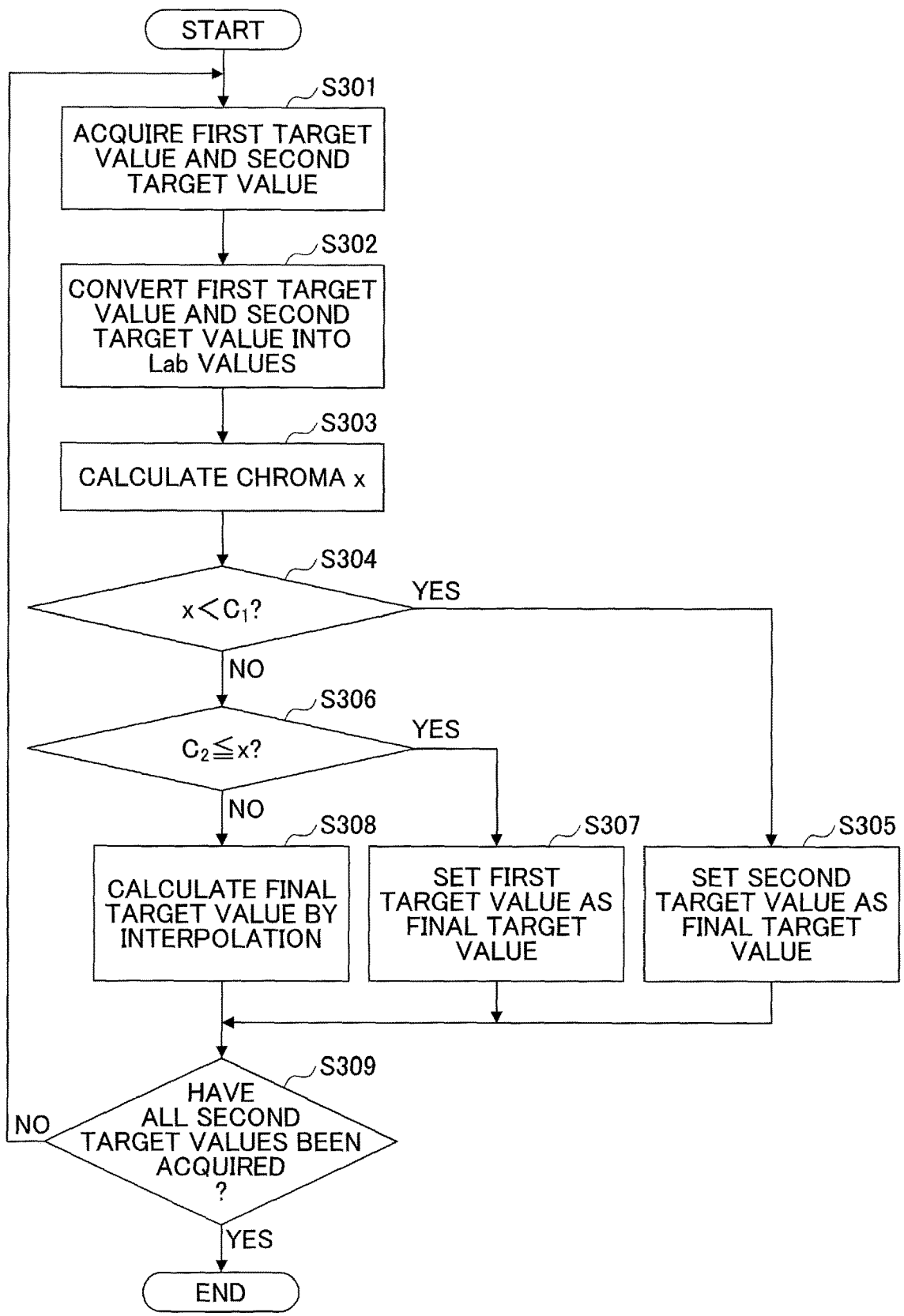
FIG. 13 is a flowchart illustrating an example of a final target value setting process according to the first embodiment of the present invention.

Hereinafter, the details of the process of setting the final target value in step S206 will be described with reference to FIG. 13. FIG. 13 is a flowchart of an example of the final target value setting process according to the first embodiment. Note that the final target value is assumed to be $(L_{out}, a_{out}, b_{out})$.

Step S301: First, the final target value setting unit 116 acquires the second target value and the first target value corresponding to the second target value. Note that the first target value corresponding to the second target value is the first target value calculated by using the same CMYK value as the CMYK value used for calculating the second target value.

Step S302: Next, the final target value setting unit 116 converts the first target value and the second target value into Lab values by a known method. Hereinafter, the first target value converted into the Lab value is expressed as $(L_{out1}, a_{out1}, b_{out1})$, and the second target value converted into the Lab value is expressed as $(L_{out2}, a_{out2}, b_{out2})$.

Step S303: Next, the final target value setting unit 116 calculates the chroma of the second target value by the chroma calculating unit 121. The chroma x of the second target value can be calculated by the following formula 6.

$$x = \sqrt{((a_{out2})^2 + (b_{out2})^2)} \qquad \text{(formula 6)}$$

Step S304: Next, the final target value setting unit 116 determines whether the chroma x is less than $C_1$.

Step S305: When it is determined in step S304 that the chroma x is less than $C_1$, the final target value setting unit 116 sets $L_{out}=L_{out1}=L_{out2}$, $a_{out}=a_{out2}$, $b_{out}=b_{out2}$. That is, the final target value setting unit 116 sets the second target value as the final target value.

Step S306: When it is determined in step S304 that the chroma x is not less than $C_1$, the final target value setting unit 116 determines whether the chroma x is greater than or equal to $C_2$.

Step S307: When it is determined in step S306 that the chroma x is greater than or equal to $C_2$, the final target value setting unit 116 sets $L_{out}=L_{out1}=L_{out2}$, $a_{out}=a_{out1}$, $b_{out}=b_{out1}$. That is, the final target value setting unit 116 sets the first target value as the final target value.

Step S308: When it is determined in step S306 that the chroma x is not greater than or equal to $C_2$, the final target value setting unit 116 sets, by the interpolating unit 122, $L_{out}=L_{out1}=L_{out2}$, $a_{out}=R \cdot a_{out1}+(R-1) \cdot a_{out2}$, $b_{out}=R \cdot b_{out1}+(R-1) \cdot b_{out2}$. That is, the final target value setting unit 116 linearly interpolates the first target value and the second target value by the interpolating unit 122 to generate and set the final target value.

Figure 14:
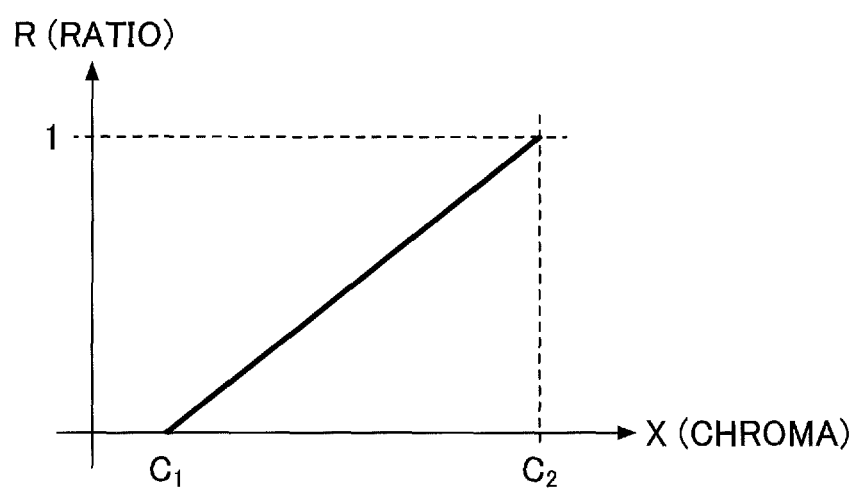
FIG. 14 is a diagram illustrating an example of the ratio of linear interpolation according to the first embodiment of the present invention.

In the above, R is $R=(1/(C_1-C_2))x-(C_1 \cdot (C_1-C_2))$. That is, R is the ratio of linear interpolation, and is expressed by the graph illustrated in FIG. 14.

Here, examples of setting the chroma $C_1$ and $C_2$ will be described in the following (1) and (2).

(1) Chroma $C_1$

The chroma $C_1$ is set near the boundary of the achromatic color gamut. Specifically, the chroma $C_1$ is set at the boundary of the gray color gamut defined by the source profile 1000.

For example, first, the final target value setting unit 116 acquires CMYK data formed of the CMYK values of (C, M, Y, K)=(16.16, 16, 0), (32.32, 32, 0), (48.48, 48, 0), . . . , (N.N, N, 0). Note that although N may be determined to be any value, it is preferable that N=approximately 128, for example.

Next, the final target value setting unit 116 obtains Lab values, which are absolute color values, by performing absolute color conversion on these CMYK values, by using the source profile 1000. These Lab values are set as $(L_{c16}, a_{c16}, b_{c16})$, $(L_{c32}, a_{c32}, b_{c32})$, $(L_{c48}, a_{c48}, b_{c48})$, . . . , $(L_{cN}, a_{cN}, b_{cN})$. Next, the final target value setting unit 116 obtains the chroma $C_{c16}, C_{c32}, C_{c48}, \ldots, C_{cN}$ of these Lab values by the following formula 7, where M=c16, c32, c48, . . . cN.

$$C_M = \sqrt{((a_M)^2 + (b_M)^2)} \qquad \text{(formula 7)}$$

Then, the final target value setting unit 116 sets, as $C_1$, the maximum value among the chroma $C_{c16}$, $C_{c32}$, $C_{c48}$, ..., $C_{cN}$.

(2) Chroma $C_2$

The chroma $C_2$ may be set at the boundary of the chromatic color gamut; however, as an example, a case of setting the chroma $C_2$ in consideration of the color difference from the target will be described.

Generally, the design quality of the output profile 2000 is determined by the color difference from the target. That is, if the final target value (target value) illustrated in FIG. 12, etc., is closer to the target, the color difference between the output profile 2000, which has been designed by using the corresponding target value, and the target is also reduced, and the quality is improved. However, even when the color difference between a certain final target value and the target is greater than or equal to the desired design target, the final target value of the achromatic color vicinity gamut (that is, a gamut having a chroma of $C_1$ or less) cannot be changed from the second target value. Therefore, there is a need to reset the $C_2$, which is already set, to a lower value, and to increase the color range in which the final target value matches the target. Note that when considering an added color difference according to the design, the color difference between the final target value and the target is preferably approximately half of the design target.

Figure 15:
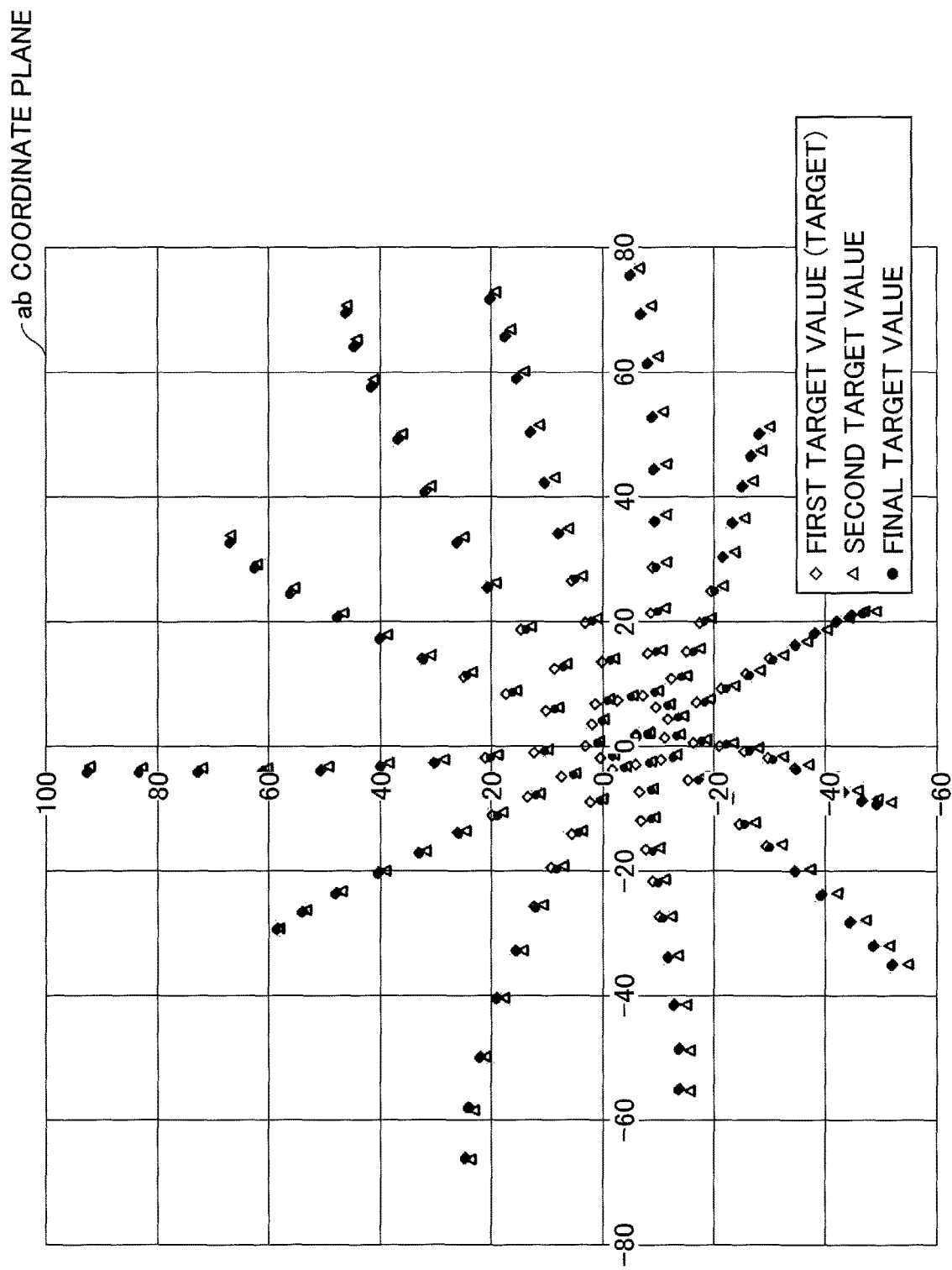
FIG. 15 is a diagram illustrating an example of a first target value, a second target value, and a final target value according to the first embodiment of the present invention.

Step S309: The final target value setting unit 116 determines whether all of the second target values (and the first target values corresponding to these second target values) have been acquired. When there is a second target that is not acquired, the process returns to step S301. On the other hand, when all of the second target values have been acquired, the final target value setting unit 116 ends the process. Accordingly, the final target values are set. Here, as an example, the first target values (targets), the second target values, and the final target values, on 12 hues, are illustrated in FIG. 15.

As described above, the profile generation apparatus 10 according to the present embodiment can set a target value (final target value) by which it is possible to obtain a matching result that does not cause color fogging in the achromatic color vicinity gamut, even for paper with a strong fluorescent characteristic. Accordingly, the profile generation apparatus 10 according to the present embodiment can generate the output profile 2000 that realizes such a matching result.

Second Embodiment

Next, a second embodiment of the present invention will be described. A case where the paper has a particularly strong fluorescence characteristic will be described in the second embodiment. When the paper has a particularly strong fluorescence characteristic, by changing step S203 (white reference value setting), step S204 (first target value), and step S206 (final target value setting) in FIG. 9 described above in the first embodiment, it is possible to set a target value that does not cause color fogging in the achromatic color vicinity gamut, even for printing paper having a particularly strong fluorescent characteristic.

Note that in the second embodiment, mainly the differences from the first embodiment will be described, and descriptions of the same constituent elements as in the first embodiment will be omitted.

<Process of Setting Target Value—Second Embodiment>

Figure 16:
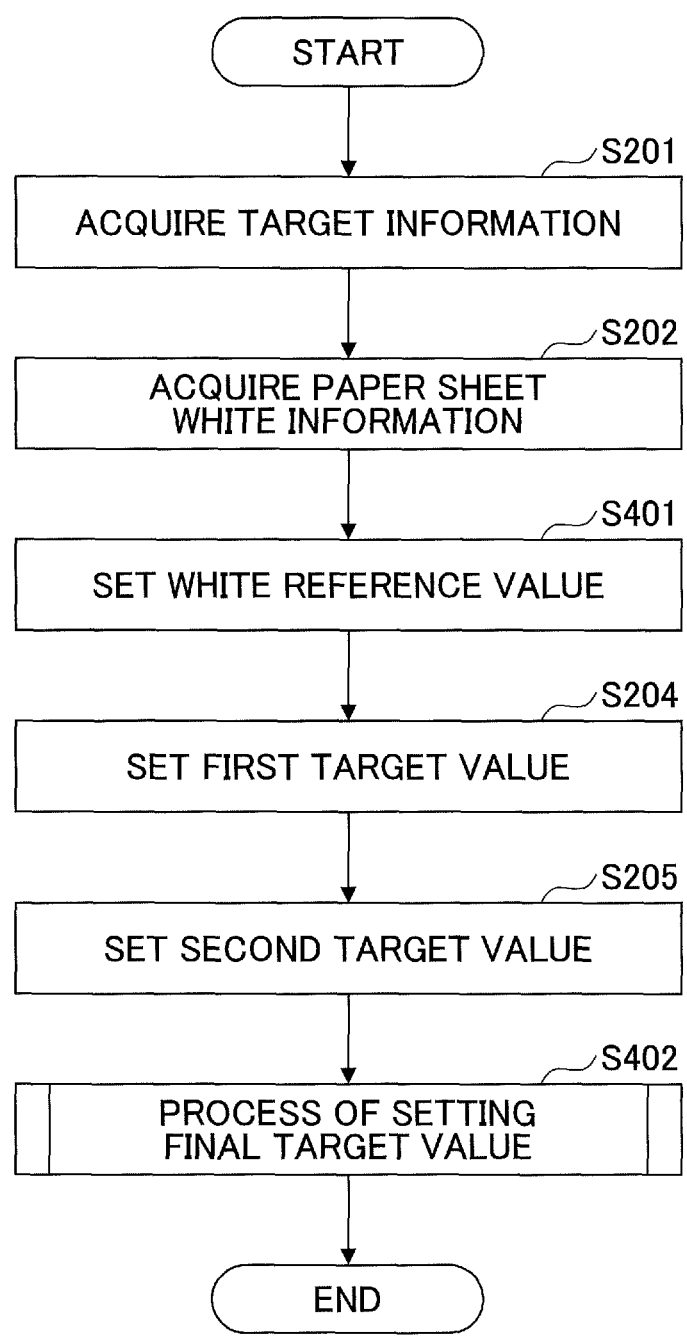
FIG. 16 is a flowchart illustrating an example of a target value setting process according to a second embodiment of the present invention.

Hereinafter, the details of the target value setting process according to the second embodiment will be described with reference to FIG. 16. FIG. 16 is a flowchart illustrating an example of a target value setting process according to the second embodiment. Note that steps S201 and S202 and steps S204 and S205 in FIG. 16 are the same as those in FIG. 9, and, therefore, descriptions thereof will be omitted.

Step S401: The white reference value setting unit 113 sets a white reference point in consideration of the white point. Here, if the fluorescent characteristic of the design paper sheet is strong, there may be cases where it is better to subjectively determine the value of the white reference point (white reference value), rather than to numerically determine the value of the white reference point (white reference value) as in the first embodiment. This is because the degree of divergence, between the appearance and the colorimetric value, is greater for paper with a stronger fluorescence characteristic.

Therefore, for example, a plurality of white reference values having different β values from each other are prepared by formula 5, matching is performed with respect to the target values (final target values) obtained by using the respective white reference values, and a matching result that is highly evaluated is selected. Then, the white reference value corresponding to the selected matching result is adopted as the white reference value, and the white reference value setting unit 113 sets the adopted white reference value. Note that the matching result that is highly evaluated is a matching result that does not cause color fogging in the achromatic color vicinity gamut (or less color fogging occurs).

Step S402: The final target value setting unit 116 generates and sets a final target value from the first target value and the second target value. Here, when the design paper sheet has a strong fluorescence characteristic, divergence between the appearance and the colorimetric value will be caused not only in the highlight gamut and the achromatic color vicinity gamut, but also in the chromatic color gamut. That is, there are cases where the colorimetric value in the case of using the colorimetric light source M1 is bluer than the sensed appearance (subjective appearance), also in the chromatic color gamut. In such a case, when matching is performed in the chromatic color gamut by using the target (first target value) as the final target value, the color will be yellowish also in the chromatic color gamut. Therefore, in the second embodiment, the final target value in the chromatic color gamut is set so as to be bluer than the first target value.

<Process of Setting Final Target Value—Second Embodiment>

Figure 17:
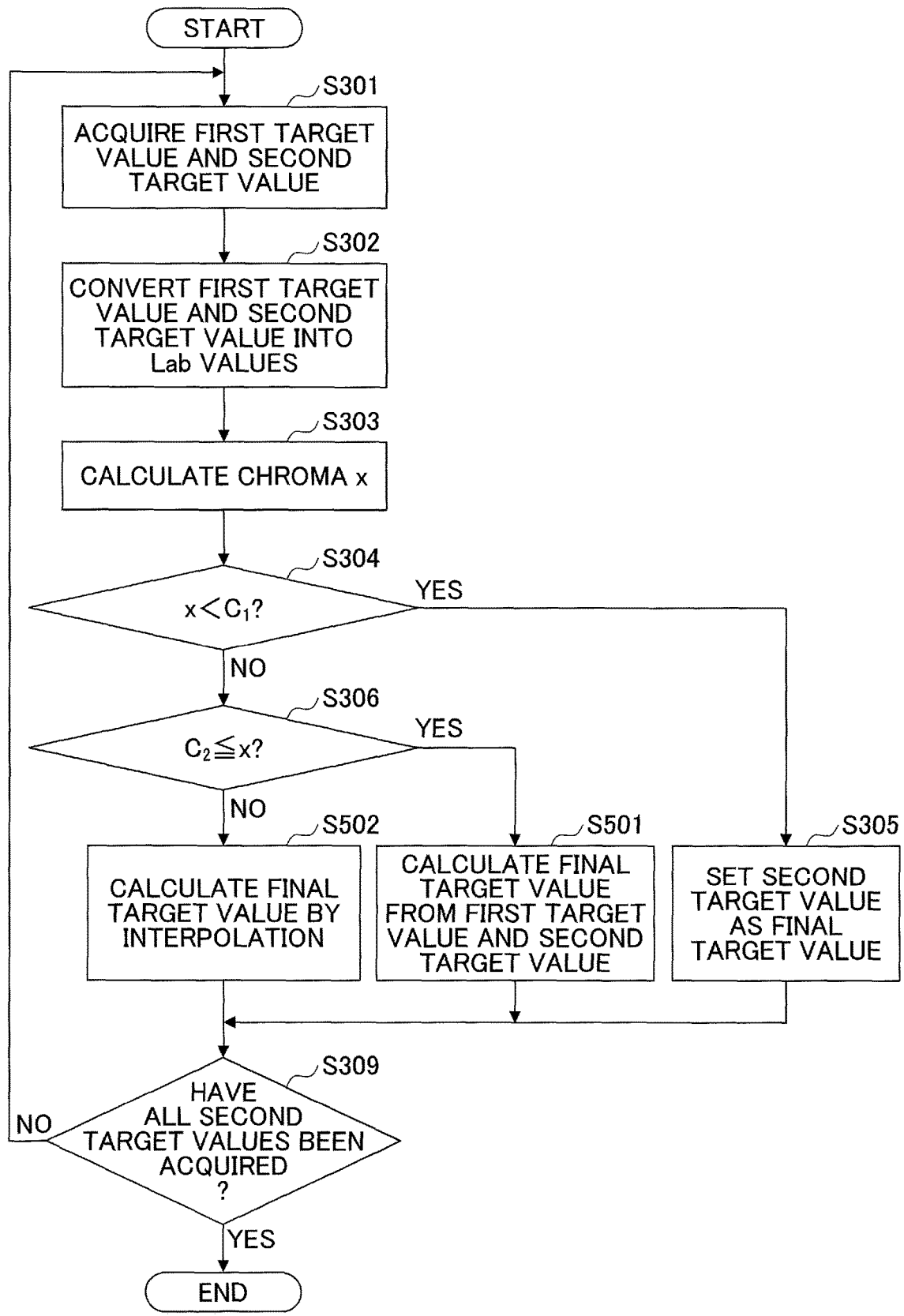
FIG. 17 is a flowchart illustrating an example of a final target value setting process according to the second embodiment of the present invention.

Hereinafter, the details of the process of setting the final target value in step S402 will be described with reference to FIG. 17. FIG. 17 is a flowchart illustrating an example of the final target value setting process according to the second embodiment. Steps S301 to S306 and step S309 in FIG. 17 are the same as those in FIG. 13, and, therefore, descriptions thereof will be omitted.

Figure 18:
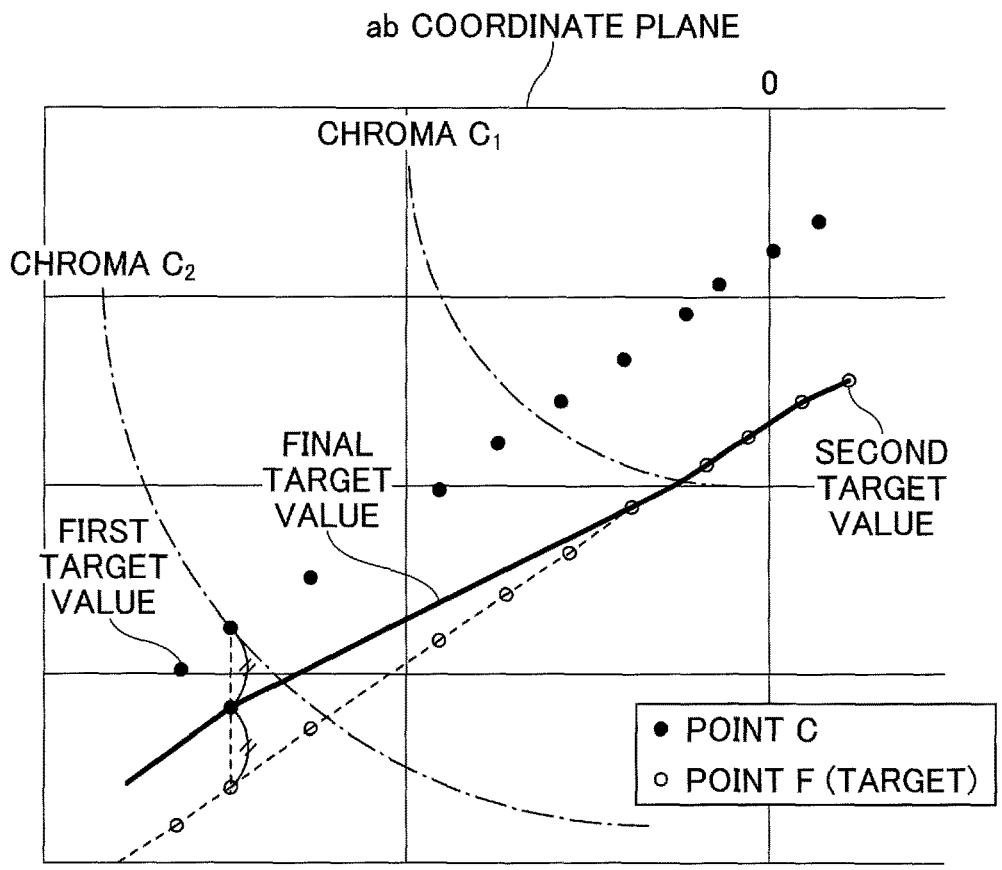
FIG. 18 is a diagram for describing an example of calculating a final target value in a chromatic color gamut from a first target value and a second target value according to the second embodiment of the present invention.

Step S501: When it is determined in step S306 that the chroma x is greater than or equal to $C_2$, the final target value setting unit 116 sets $L_{out}=L_{out1}=L_{out2}$, $a_{out}=r \cdot a_{out1}+(r-1) \cdot a_{out2}$, $b_{out}=r \cdot b_{out1}+(r-1) \cdot b_{out2}$. Here, r=0.0 or more and less than 1.0. The value of r is set to be lower for paper with a stronger fluorescence characteristic. That is, the final target value setting unit 116 sets a value that is bluer than the first target value, as the final target value in the chromatic color gamut. A case where the final target value is set to be bluer than the first target value is illustrated in FIG. 18. As illustrated in FIG. 18, in the chromatic color gamut, the final target value is set at a position that is closer to blue than the first target value.

Step S502: When it is determined in step S306 that the chroma x is not greater than or equal to $C_2$, the final target value setting unit 116 linearly interpolates the first target value and the second target value by the interpolating unit 122 to obtain the final target value. When the final target value in the chromatic color gamut is changed as in the step S501, the ratio R of the linear interpolation is also changed.

Specifically, the final target value setting unit 116 sets, by the interpolating unit 122, $L_{out}=L_{out1}=L_{out2}$, $a_{out}=R \cdot a_{out1}+(R-1) \cdot a_{out2}$, $b_{out}=R \cdot b_{out1}+(R-1) \ b_{out2}$, where $R=r \cdot ((1/(C_1-C_2))x-(C_1 \cdot (C_1-C_2)))$.

Figure 19:
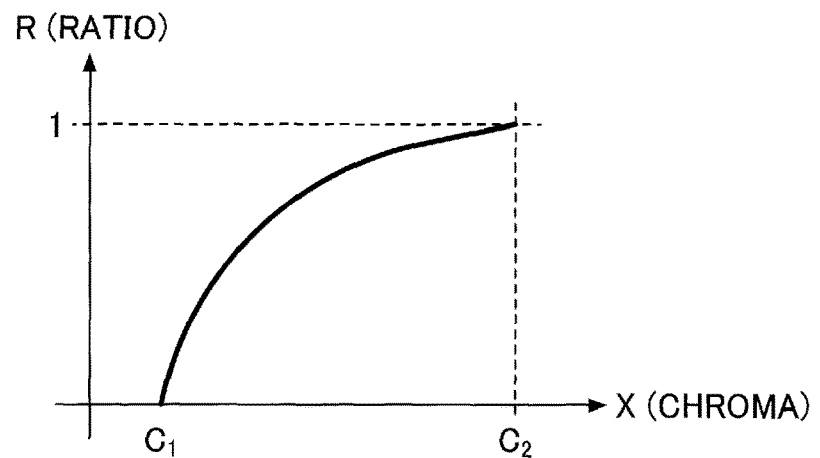
FIG. 19 is a diagram illustrating an example of a ratio of logarithmic function interpolation according to the second embodiment of the present invention.
Figure 20:
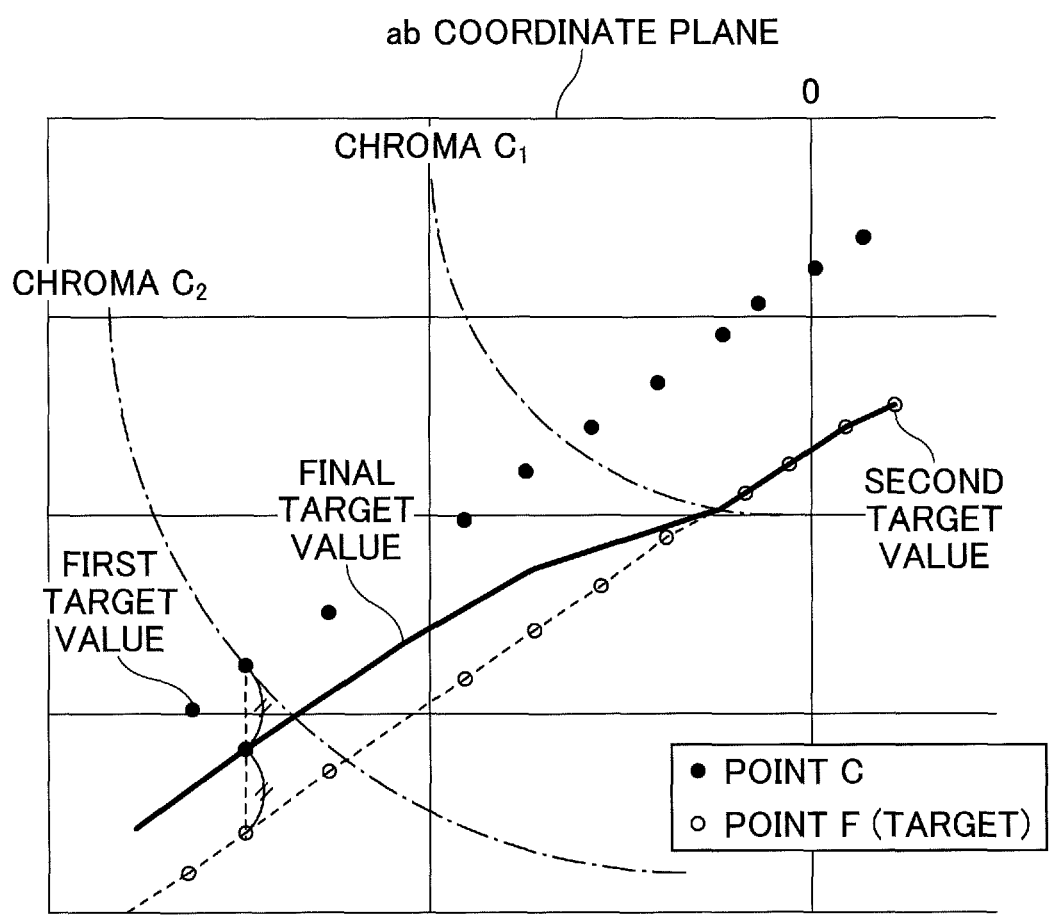
FIG. 20 is a diagram for describing an example of interpolation of a target value by logarithmic function interpolation according to the second embodiment of the present invention.

As described above, the final target value is set in the case where the fluorescence characteristic of the design paper sheet is particularly strong. In the above step S502, R is changed in accordance with the change of the final target value in the chromatic color gamut; however, there are cases where a theoretical color difference is caused with respect to the target. In the case of numerically evaluating the color accuracy or obtaining authentication, the theoretical color difference is preferably small. Therefore, in step S502 above, for example, R as indicated below in formula 8, $$R = r \cdot \left( \frac{\log_{C_1} C_1 x - 1}{\log_{C_1} C_2 - 1} \right) \quad \text{(formula 8)}$$

may be used to perform logarithmic function interpolation by the interpolating unit 122. This R value is a ratio of logarithmic function interpolation, and is expressed by a graph as illustrated in FIG. 19. As illustrated in FIG. 20, compared to the case of performing linear interpolation, by performing logarithmic function interpolation, it can be seen that the convergence to the first target value is achieved at an early stage as the chroma range becomes higher. Therefore, by performing logarithmic function interpolation, the theoretical color difference with respect to the target can be reduced as compared to the case of performing linear interpolation. In this case, in the intermediate gamut where the chroma is $C_1$ or more and less than $C_2$, the final target value setting unit 116 sets an interpolation value obtained by performing logarithmic function interpolation, as the third target value.

As described above, the profile generation apparatus 10 according to the present embodiment can set a target value (final target value) that can obtain a matching result that does not cause color fogging in the achromatic color vicinity gamut, even for paper having a particularly strong fluorescence characteristic.

According to one embodiment of the present invention, it is possible to set a target value that suppresses color fogging in an achromatic color vicinity gamut, even for a recording medium having a strong fluorescent characteristic.

The information processing apparatus, the color profile generation system, the information processing method, and the recording medium are not limited to the specific embodiments described in the detailed description, and variations and modifications may be made without departing from the spirit and scope of the present invention.

What is claimed is:

1. An information processing apparatus for generating a second profile for reproducing, on a predetermined recording medium having a fluorescent characteristic, a color defined in a predetermined first profile, the information processing apparatus comprising:
a processor configured to:
acquire, as a white color value of the predetermined recording medium, a colorimetric value obtained by performing colorimetric measurement on the predetermined recording medium under a colorimetric condition of using a light source including ultraviolet rays;
set a white reference value that is different from the white color value, based on the acquired white color value;
acquire, as a first target value, a color value in a Lab uniform color space defined by the predetermined first profile;
acquire, as a second target value, a color value obtained by converting the acquired color value in the Lab uniform color space, based on the white reference value; and
set the second target value as a target value with respect to a gamut having a chroma that is less than a predetermined first chroma in the Lab uniform color space.

2. The information processing apparatus according to claim 1, wherein the processor is further configured to set the first target value as a target value with respect to a gamut having a chroma that is greater than or equal to a predetermined second chroma in the Lab uniform color space, based on at least the color value in the Lab uniform color space.

3. The information processing apparatus according to claim 2, wherein the processor is further configured to interpolate a third target value with respect to a gamut having a chroma that is greater than or equal to the predetermined first chroma and less than the predetermined second chroma in the Lab uniform color space, the third target value being interpolated based on the first target value and the second target value.

4. The information processing apparatus according to claim 3, wherein the processor is further configured to perform linear interpolation or logarithmic function interpolation, to interpolate the third target value with respect to the gamut having the chroma that is greater than or equal to the predetermined first chroma and less than the predetermined second chroma in the Lab uniform color space, the third target value being interpolated based on the first target value and the second target value.

5. The information processing apparatus according to claim 3, wherein the processor is further configured to set the first target value, the second target value, and the third target value as target values for generating the second profile.

6. The information processing apparatus according to claim 2, wherein the processor is further configured to acquire, as the first target value, a value on a line segment connecting the color value in the Lab uniform color space and the color value obtained by converting the color value in the Lab uniform color space.

7. The information processing apparatus according to claim 2, wherein the predetermined second chroma is a chroma expressing a boundary of a gray vicinity gamut defined in the predetermined first profile.

8. The information processing apparatus according to claim 1, wherein the processor is further configured to acquire, as the white reference value, a coordinate on an extended line of a line segment connecting either one of an origin in an ab coordinate plane in the Lab uniform color space or a color value obtained by converting a paper color defined by the predetermined first profile into a coordinate value in the Lab uniform color space, and the white color value of the predetermined recording medium, or a coordinate within a range where a hue difference from the extended line is less than a threshold.

9. The information processing apparatus according to claim 1, wherein the processor is further configured to acquire the white reference value based on a difference between a first colorimetric value obtained by performing colorimetric measurement on the predetermined recording medium under a colorimetric condition of using a first light source including ultraviolet rays, and a second colorimetric value obtained by performing colorimetric measurement on the predetermined recording medium under a colorimetric condition of using a second light source that does not include ultraviolet rays.

10. The information processing apparatus according to claim 1, wherein the processor is further configured to acquire a plurality of the white reference values, and use results obtained by reproducing, on the predetermined recording medium, the target values based on the acquired plurality of the white reference values, to acquire a white reference corresponding to a result selected from the results.

11. A color profile generation system comprising:
the information processing apparatus according to claim 1: and
an image output apparatus, wherein
the image output apparatus executes image output based on the second profile generated by the information processing apparatus.

12. An information processing method executed by an information processing apparatus for generating a second profile for reproducing, on a predetermined recording medium having a fluorescent characteristic, a color defined in a predetermined first profile, the information processing method comprising:
acquiring, as a white color value of the predetermined recording medium, a colorimetric value obtained by performing colorimetric measurement on the predetermined recording medium under a colorimetric condition of using a light source including ultraviolet rays;
setting a white reference value that is different from the white color value, based on the acquired white color value;
acquiring, as a first target value, a color value in a Lab uniform color space defined by the predetermined first profile;
acquiring, as a second target value, a color value obtained by converting the acquired color value in the Lab uniform color space, based on the white reference value; and
setting the second target value as a target value with respect to a gamut having a chroma that is less than a predetermined first chroma in the Lab uniform color space.

13. A non-transitory computer-readable recording medium storing a program that causes a computer to execute a process performed in an information processing apparatus for generating a second profile for reproducing, on a predetermined recording medium having a fluorescent characteristic, a color defined in a predetermined first profile, the process comprising:
acquiring, as a white color value of the predetermined recording medium, a colorimetric value obtained by performing colorimetric measurement on the predetermined recording medium under a colorimetric condition of using a light source including ultraviolet rays;
setting a white reference value that is different from the white color value, based on the acquired white color value;
acquiring, as a first target value, a color value in a Lab uniform color space defined by the predetermined first profile;
acquiring, as a second target value, a color value obtained by converting the acquired color value in the Lab uniform color space, based on the white reference value; and
setting the second target value as a target value with respect to a gamut having a chroma that is less than a predetermined first chroma in the Lab uniform color space.

* * * * *